United States Patent
Rong et al.

(10) Patent No.: US 10,164,720 B2
(45) Date of Patent: Dec. 25, 2018

(54) METHOD AND APPARATUS FOR RECIPROCITY CALIBRATION BETWEEN BASE STATIONS

(71) Applicant: Huawei Technologies Co., Ltd., Shenzhen, Guangdong (CN)

(72) Inventors: Lu Rong, Shanghai (CN); Dageng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 15/192,596

(22) Filed: Jun. 24, 2016

(65) Prior Publication Data

US 2016/0308624 A1    Oct. 20, 2016

Related U.S. Application Data

(63) Continuation of application No. PCT/CN2013/090587, filed on Dec. 26, 2013.

(51) Int. Cl.
*H04B 17/12* (2015.01)
*H04B 7/024* (2017.01)
(Continued)

(52) U.S. Cl.
CPC ............ *H04B 17/12* (2015.01); *H04B 7/024* (2013.01); *H04B 7/0413* (2013.01);
(Continued)

(58) Field of Classification Search
CPC ......... H04B 7/024; H04B 17/12; H04B 17/14
See application file for complete search history.

(56) References Cited

U.S. PATENT DOCUMENTS

| | | | |
|---|---|---|---|
| 8,891,598 B1* | 11/2014 | Wang | H04L 25/0398 370/241 |
| 2010/0303015 A1* | 12/2010 | Ko | H04B 7/024 370/328 |

(Continued)

FOREIGN PATENT DOCUMENTS

| | | |
|---|---|---|
| CN | 102149123 A | 8/2011 |
| CN | 102326337 A | 1/2012 |

(Continued)

OTHER PUBLICATIONS

"On antenna calibration of LTE", CATT, 3GPP TSG RAN1 #52, Jan. 11-15, 2008, 2 pages, R1-080802.

(Continued)

*Primary Examiner* — Benjamin Lamont

(57) ABSTRACT

Embodiments of the present invention provide a method and an apparatus for reciprocity calibration between base stations, which relate to the communications field, and can improve precision of reciprocity calibration between base stations. The method includes: obtaining, by each base station by means of calculation, a precoding vector corresponding to a selected subcarrier of the base station; sending, by all the base stations to UE by using the selected subcarriers of the base stations, downlink user-dedicated reference signals that are mutually orthogonal between cells corresponding to the base stations; obtaining, by each base station, an inter-base station calibration compensation coefficient of the selected subcarrier of the base station; and adjusting, by each base station, a self-calibration matrix of the selected subcarrier according to the inter-base station calibration compensation coefficient of the selected subcarrier of the base station.

11 Claims, 9 Drawing Sheets

(51) Int. Cl.
*H04B 7/0413* (2017.01)
*H04B 7/0456* (2017.01)
*H04B 17/14* (2015.01)
*H04L 5/00* (2006.01)

(52) U.S. Cl.
CPC .......... *H04B 7/0478* (2013.01); *H04B 17/14* (2015.01); *H04L 5/0023* (2013.01); *H04L 5/0051* (2013.01); *H04L 5/0073* (2013.01)

(56) References Cited

U.S. PATENT DOCUMENTS

| | | | | |
|---|---|---|---|---|
| 2011/0103271 A1* | 5/2011 | Han | ........................ | H04B 7/024 370/280 |
| 2011/0263280 A1* | 10/2011 | Guey | ..................... | H04B 7/024 455/500 |
| 2012/0302281 A1* | 11/2012 | Takano | .................. | H04B 7/024 455/524 |
| 2012/0315891 A1* | 12/2012 | Takano | .................. | H04B 7/024 455/422.1 |
| 2013/0114459 A1* | 5/2013 | Luo | ........................ | H04W 24/00 370/252 |
| 2014/0269554 A1* | 9/2014 | Shapira | .............. | H04B 17/0007 370/329 |
| 2015/0341096 A1* | 11/2015 | Gao | ..................... | H04B 7/0634 370/278 |

FOREIGN PATENT DOCUMENTS

| | | | |
|---|---|---|---|
| CN | 102340339 A | 2/2012 | |
| CN | 103259581 A | 8/2013 | |
| WO | 2010/140829 A2 | 12/2010 | |
| WO | 2010/148552 A1 | 12/2010 | |
| WO | WO-2010148552 A1 * | 12/2010 | ......... H04L 25/0228 |

OTHER PUBLICATIONS

"Discussion on antenna calibration in TDD", Mitsubishi Electric, 3GPP TSG RAN WG1 #55bis meeting, Jan. 12-16, 2009, 4 pages, R1-090043.

"Antenna Array Calibration for TDD CoMP", Alcatel-Lucent Shanghai Bell, 3GPP TSG RAN WG1 Meeting #59bis, Jan. 18-22, 2010, 5 pages, R1-100427.

"Coordinated Antenna Calibration for CoMP", Sony Corporation, 3GPP TSG RAN WG1 #63bis, Jan. 17-21, 2011, 2 pages, R1-110063.

"Reciprocity modelling for TDD CoMP evaluation", Alcatel-Lucent Shanghai Bell, 3GPP TSG-RAN WG1 #65, May 9-13, 2011, 5 pages, R1-111983.

Fan Huang et al., "Performance Analysis of Antenna Calibration in Coordinated Multi-Point Transmission System", IEEE, 2010, 5 pages.

* cited by examiner

CONT.
FROM
FIG. 6A

```
The base station obtains a downlink user-dedicated reference signal
by performing multiple-antenna weighting according to the
precoding vector corresponding to the calibration subcarrier, and     —— 606
sends the downlink user-dedicated reference signal to the calibration
UE by using the calibration subcarrier
```

```
The calibration UE receives the downlink user-dedicated reference
signal sent by the base station, and obtains, by means of calculation
according to the downlink user-dedicated reference signal, a          —— 607
downlink channel estimation matrix corresponding to the calibration
subcarrier of the base station
```

```
The calibration UE obtains, by means of calculation according to the
downlink channel estimation matrix corresponding to the calibration
subcarrier of the base station, a relative matrix corresponding to the   —— 608
calibration subcarrier of the base station, and feeds back the relative
matrix to a serving base station of the calibration UE
```

```
The base station receives the relative matrix corresponding to the
calibration subcarrier and obtains an inter-base station calibration
compensation coefficient of the calibration subcarrier by means of    —— 609
calculation according to the relative matrix corresponding to the
calibration subcarrier
```

```
The base station adjusts a self-calibration matrix of the calibration   —— 610
subcarrier according to the inter-base station calibration
compensation coefficient of the calibration subcarrier
```

FIG. 6B

METHOD AND APPARATUS FOR RECIPROCITY CALIBRATION BETWEEN BASE STATIONS

CROSS-REFERENCE TO RELATED APPLICATIONS

This application is a continuation of International Application No. PCT/CN2013/090587, filed on Dec. 26, 2013, which is hereby incorporated by reference in its entirety.

TECHNICAL FIELD

The present invention relates to the communications field, and in particular, to a method and an apparatus for reciprocity calibration between base stations.

BACKGROUND

A CoMP (coordinated multipoint transmission/reception) technology refers to a new technology in which multiple geographically-separated base stations coordinately transmit data to be sent to one terminal or jointly receive data sent by one terminal. The technology can effectively improve service quality for cell edge users, and therefore the technology is widely used in various transmission systems.

In a TD-LTE (Time Division-Long Term Evolution) system that uses the CoMP technology, an uplink channel and a downlink channel in the TD-LTE system use a same frequency band, and therefore have channel reciprocity. However, in a practical system, reciprocity between the uplink channel and the downlink channel is not absolute, that is, a reciprocity error exists, which may damage performance of a TDD system. In application of the CoMP technology, multiple base stations need to send data to same user equipment. Therefore, in addition to reciprocity calibration that needs to be performed between multiple antennas inside a base station, reciprocity calibration between the base stations with respect to the user equipment needs to be considered.

There is a method for reciprocity calibration between base stations in the prior art. One user equipment is selected, and the user equipment may send a pilot signal to each base station by using an air interface channel that exists between the user equipment and the base station, so that the base station estimates, according to the pilot signal, an uplink channel estimation matrix corresponding to the base station, and then the user equipment estimates, according to a pilot signal sent by each base station, a downlink channel estimation matrix corresponding to the base station, and feeds back, to the base station, the downlink channel estimation matrix corresponding to the base station. In this way, each base station may obtain, by using uplink/downlink channel estimation matrix information corresponding to the base station, a calibration matrix corresponding to the base station, and then, reciprocity calibration between base stations with respect to the user equipment is performed.

In a process of implementing the foregoing reciprocity calibration between base stations, the inventor finds that during reciprocity error calibration between the base stations, because of a relatively far distance between the base stations, and relatively poor quality of an air interface channel from the user equipment to each base station, precision of an obtained channel estimation matrix is extremely low, which causes extremely low precision of reciprocity calibration between the base stations, and causes an extremely heavy system performance loss.

SUMMARY

Embodiments of the present invention provide a method and an apparatus for reciprocity calibration between base stations, which may improve precision of reciprocity calibration between the base stations, and further improve system performance.

To achieve the foregoing purpose, the following technical solutions are adopted in the embodiments of the present invention:

According to a first aspect, a method for reciprocity calibration between base stations is disclosed and applied to at least two base stations, where the method includes:

obtaining, by each base station by means of calculation, a precoding vector corresponding to a selected subcarrier of the base station;

sending, by all the base stations to UE by using the selected subcarriers of the base stations, downlink user-dedicated reference signals that are mutually orthogonal between cells corresponding to the base stations, where the downlink user-dedicated reference signal is obtained by means of calculation by each base station by performing multiple-antenna weighting of the base station according to the precoding vector;

obtaining, by each base station, an inter-base station calibration compensation coefficient of the selected subcarrier of the base station; and adjusting, by each base station, a self-calibration matrix of the selected subcarrier according to the inter-base station calibration compensation coefficient of the selected subcarrier of the base station.

With reference to the first aspect, in a first possible implementation manner, the receiving and obtaining, by each base station, an inter-base station calibration compensation coefficient of the selected subcarrier of the base station includes:

correspondingly receiving, by each base station, channel matrix information that is corresponding to the selected subcarrier of the base station and obtained by the UE by means of calculation according to the downlink user-dedicated reference signal; and obtaining, by each base station by means of calculation, the inter-base station calibration compensation coefficient of the selected subcarrier of the base station according to the channel matrix information corresponding to a calibration subcarrier.

According to a second aspect, a method for reciprocity calibration between base stations is disclosed and applied to UE, where the method includes:

receiving, by the UE, downlink user-dedicated reference signals that are mutually orthogonal between cells corresponding to all base stations and sent by the base stations by using selected subcarriers;

obtaining, by the UE by means of calculation according to the downlink user-dedicated reference signal, channel matrix information corresponding to the selected subcarrier of each base station; and sending, by the UE, the channel matrix information corresponding to the selected subcarrier of the base station to a serving base station of the UE.

According to a third aspect, a communications system is disclosed and includes at least two base stations; where:

a calculation unit of each base station is configured to obtain, by means of calculation, a precoding vector corresponding to a selected subcarrier of the base station;

a sending unit of each base station is configured to send, to UE by using selected subcarriers of the base stations, downlink user-dedicated reference signals that are mutually orthogonal between cells corresponding to the base stations, where the downlink user-dedicated reference signal is obtained by means of calculation by each base station by performing multiple-antenna weighting of the base station according to the precoding vector;

the calculation unit of each base station is further configured to obtain an inter-base station calibration compensation coefficient of the selected subcarrier of the base station by means of calculation; and an adjustment unit of each base station is configured to adjust a self-calibration matrix of the selected subcarrier according to the inter-base station calibration compensation coefficient of the selected subcarrier of the base station.

With reference to the third aspect, in a first possible implementation manner, a receiving unit of each base station is configured to receive channel matrix information that is corresponding to the selected subcarrier of the base station and obtained by the UE by means of calculation according to the downlink user-dedicated reference signal; and the calculation unit of each base station is specifically configured to obtain, by means of calculation, the inter-base station calibration compensation coefficient of the selected subcarrier of the base station according to the channel matrix information corresponding to a calibration subcarrier.

According to a fourth aspect, user equipment UE is disclosed, including:

a receiving unit, configured to receive downlink user-dedicated reference signals that are mutually orthogonal between cells corresponding to all base stations and sent by the base stations by using selected subcarriers;

a calculation unit, configured to obtain, by means of calculation according to the downlink user-dedicated reference signal received by the receiving unit, channel matrix information corresponding to the selected subcarrier of each base station; and a sending unit, configured to send the channel matrix information corresponding to the selected subcarrier of the base station to a serving base station of the UE.

The embodiments of the present invention provide a method and an apparatus for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

BRIEF DESCRIPTION OF THE DRAWINGS

FIG. 6A and FIG. 6B are schematic flowcharts of another method for reciprocity calibration between base stations according to Embodiment 3 of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
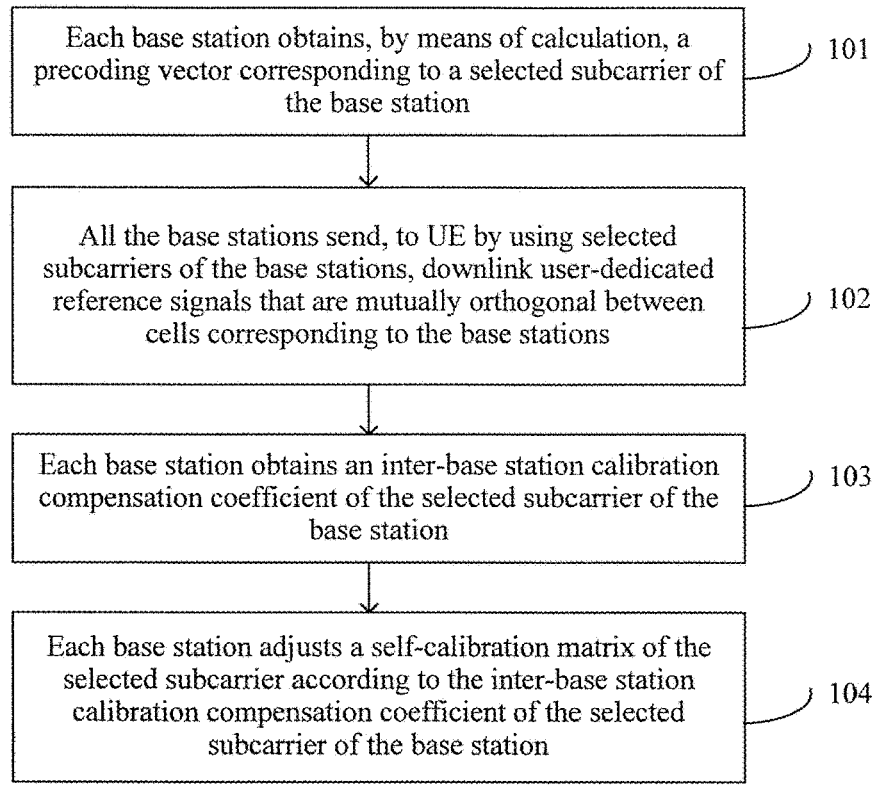
FIG. 1 is a schematic flowchart of a method for reciprocity calibration between base stations according to Embodiment 1 of the present invention.

This embodiment of the present invention provides a method for reciprocity calibration between base stations, where the method is applied to at least two base stations. As shown in FIG. 1, the method includes:

101. Each base station obtains, by means of calculation, a precoding vector corresponding to a selected subcarrier of the base station.

Generally, one base station covers multiple cells, and during reciprocity calibration between base stations, reciprocity calibration is performed on cells corresponding to the base stations. Exemplarily, when reciprocity calibration is being performed for two base stations, actually one cell is selected from cells covered by each of the two base stations, and then reciprocity calibration is performed on the two cells for the two base stations. Therefore, the base stations send, to UE by using selected subcarriers, downlink user-dedicated reference signals that are mutually orthogonal between the cells corresponding to the base stations. In addition, the UE is calibration UE described in embodiments of the present invention, and the selected subcarrier is a calibration subcarrier corresponding to the calibration UE.

Before obtaining, by means of calculation, the precoding vector corresponding to the selected subcarrier of the base station, the base station further performs some steps to obtain a downlink user-dedicated reference signal. The steps include: The base station first performs self-calibration to obtain a self-calibration matrix corresponding to each subcarrier of the base station; receives an uplink reference signal sent by each reference UE by using a reference subcarrier, and obtains an uplink channel estimation matrix on the reference subcarrier by means of calculation according to the uplink reference signal; and selects, according to the uplink channel estimation matrix on the reference subcarrier, the calibration UE of the base station and the calibration subcarrier corresponding to the calibration UE from the reference UE and the reference subcarrier corresponding to the reference UE. In this way, an uplink channel estimation matrix on the calibration subcarrier corresponding to the calibration UE may be obtained. Then, a precoding vector corresponding to the calibration subcarrier of each base station is obtained by means of calculation according to the uplink channel estimation matrix on the calibration subcarrier corresponding to the calibration UE. Finally, the base station may obtain the downlink user-dedicated reference signal by performing multiple-antenna weighting on the precoding vector corresponding to the calibration subcarrier.

102. All the base stations send, to UE by using selected subcarriers of the base stations, downlink user-dedicated reference signals that are mutually orthogonal between cells corresponding to the base stations.

The UE is the calibration UE, the selected subcarrier is the calibration subcarrier corresponding to the calibration UE, and the mutual orthogonality includes frequency division orthogonality, time division orthogonality, code division orthogonality, time-frequency orthogonality, time-code orthogonality, frequency-code orthogonality, or time-frequency-code orthogonality. Different from a reference signal sent by each base station to UE in the prior art, the downlink user-dedicated reference signal is obtained by each base station by performing multiple-antenna weighting on the precoding vector corresponding to the calibration subcarrier. In this way, the calibration UE may obtain more accurate channel matrix information by means of calculation according to the downlink user-dedicated reference signals after receiving the downlink user-dedicated reference signals, so that the base station obtains a more accurate calibration result.

In addition, all the base stations simultaneously send the downlink user-dedicated reference signals of the cells corresponding to the base stations to the UE; or all the base stations successively send, at an interval of a preset time, the downlink user-dedicated reference signals of the cells corresponding the base stations to the UE, where the preset time is less than a period in which phase shift occurs between the base station and a transceiver of the UE.

103. Each base station obtains an inter-base station calibration compensation coefficient of the selected subcarrier of the base station.

Herein, each base station first receives channel matrix information that is corresponding to the selected subcarrier of the base station and obtained by corresponding calibration UE by means of calculation according to the downlink user-dedicated reference signal. Then, the inter-base station calibration compensation coefficient of the selected subcarrier of the base station is obtained by means of calculation according to the channel matrix information corresponding to the selected subcarrier.

It should be noted that the UE herein is calibration UE, and the selected subcarrier is a calibration subcarrier corresponding to the calibration UE.

104. Each base station adjusts a self-calibration matrix of the selected subcarrier according to the inter-base station calibration compensation coefficient of the selected subcarrier of the base station.

A self-calibration matrix of the calibration subcarrier includes a transmit channel self-calibration matrix and a receive channel self-calibration matrix. Therefore, that the base station adjusts the self-calibration matrix according to the inter-base station calibration compensation coefficient actually needs adjustment on both the transmit channel self-calibration matrix and the receive channel self-calibration matrix. A specific method for adjusting the self-calibration matrix by using a compensation coefficient is: dividing the transmit channel self-calibration matrix by the inter-base station calibration compensation coefficient; or multiplying the receive channel self-calibration matrix by the inter-base station calibration compensation coefficient; or dividing the transmit channel self-calibration matrix by $\beta$ and multiplying the receive channel self-calibration matrix by $\alpha$, where a product of $\alpha$ and $\beta$ is equal to the inter-base station calibration compensation coefficient.

Figure 2:
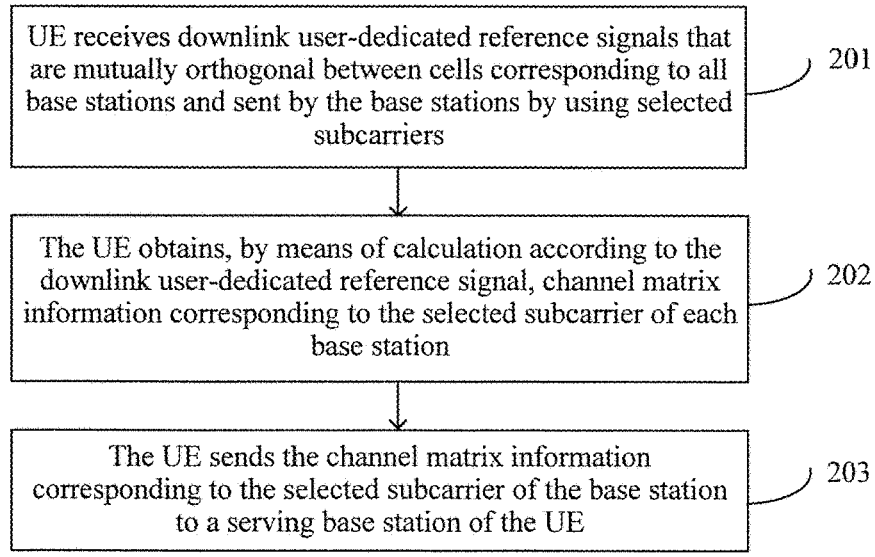
FIG. 2 is a schematic flowchart of another method for reciprocity calibration between base stations according to Embodiment 1 of the present invention.

This embodiment of the present invention further provides a method for reciprocity calibration between base stations, and the method is executed by UE. As shown in FIG. 2, the method includes the following steps:

201. The UE receives downlink user-dedicated reference signals that are mutually orthogonal between cells corresponding to all base stations and sent by the base stations by using selected subcarriers.

Herein, the UE is calibration UE, and the selected subcarrier is a calibration subcarrier corresponding to the calibration UE.

202. The UE obtains, by means of calculation according to the downlink user-dedicated reference signal, channel matrix information corresponding to the selected subcarrier of each base station.

Herein, the UE is calibration UE, and the selected subcarrier is a calibration subcarrier corresponding to the calibration UE. Herein, there are two cases in which the calibration UE obtains, by means of calculation, the channel matrix information corresponding to the calibration subcarrier of each base station. The first case is: the calibration UE obtains, by means of calculation according to the downlink user-dedicated reference signal, a downlink channel estimation matrix $h_{DL}$ corresponding to the calibration subcarrier of each base station.

The second case is: the calibration UE first obtains, by means of calculation, a downlink channel estimation matrix corresponding to the calibration subcarrier of each base station, and then for each base station except a serving base station of the calibration UE, obtains, by means of calculation, a relative matrix $h_r$ corresponding to the calibration subcarrier of each base station, where $h_r = r \cdot h1/h2$, r is a constant, h1 is a downlink channel estimation matrix corresponding to a subcarrier of the base station, and h2 is a downlink channel estimation matrix of the serving base station corresponding to the calibration UE. Particularly, a relative matrix of the serving base station of the calibration UE is constant r. Herein, h2 is a downlink channel estimation matrix of a reference base station selected by the calibration UE. Generally, the calibration UE selects a serving base station corresponding to the calibration UE as the reference base station. Certainly, another to-be-calibrated base station corresponding to the calibration UE may also be selected as the reference base station.

203. The UE sends the channel matrix information corresponding to the selected subcarrier of the base station to a serving base station of the UE.

As described above, the UE is calibration UE, and the selected subcarrier is a calibration subcarrier corresponding to the calibration UE.

This embodiment of the present invention provides a method for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

Embodiment 2

Figure 3:
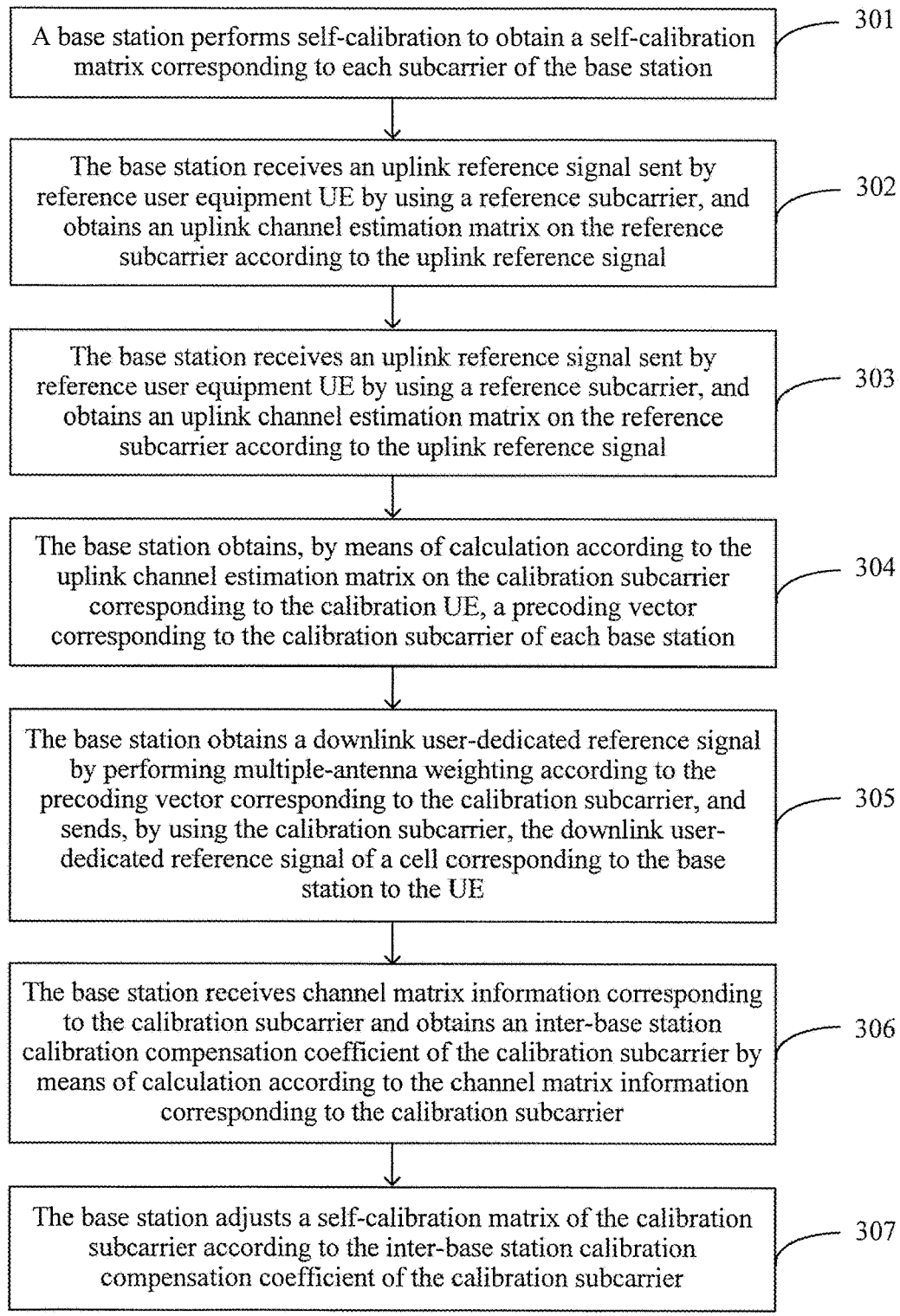
FIG. 3 is a schematic flowchart of a method for reciprocity calibration between base stations according to Embodiment 2 of the present invention.

This embodiment of the present invention provides a method for reciprocity calibration between base stations, and the method is executed by a base station. As shown in FIG. 3, the method includes the following steps:

301. The base station performs self-calibration to obtain a self-calibration matrix corresponding to each subcarrier of the base station.

During reciprocity calibration between base stations, self-calibration needs to be performed on each base station, so as to obtain the self-calibration matrix. For a base station, a method for obtaining the self-calibration matrix of the base station includes: selecting, by the base station, an antenna of the base station as a calibration antenna. The calibration antenna sends a reference signal to another antenna of the base station, and the another antenna of the base station receives and detects the reference signal, so as to obtain a receive channel calibration matrix of the base station; the another antenna of the base station sends another reference signal to the calibration antenna, and the calibration antenna receives and detects the another reference signal, so as to obtain a transmit channel calibration matrix of the base station. In this way, the base station obtains the self-calibration matrix of the base station, that is, the transmit channel calibration matrix and the receive channel calibration matrix.

302. The base station receives an uplink reference signal sent by reference user equipment UE by using a reference subcarrier, and obtains an uplink channel estimation matrix on the reference subcarrier according to the uplink reference signal.

An RB (radio bearer) exists between the base station and the UE, and is used to carry a subcarrier for interaction between the UE and the base station, where the reference subcarrier is also carried on the RB. In addition, the reference UE may send the uplink reference signal to the base station by using one antenna, or may send the uplink reference signal to the base station by using multiple antennas.

It should be noted that, if the base station is a serving base station of the reference UE, before receiving the uplink reference signal sent by the reference UE by using the reference subcarrier, the serving base station sends a first indication message to the reference UE, where the first indication message instructs the reference UE to send the uplink reference signal to a to-be-calibrated base station on a specified reference subcarrier. Herein, the reference subcarrier is carried on a reference RB, that is, the serving base station instructs the reference UE to send the uplink reference signal on the reference subcarrier.

303. The base station selects, according to the uplink channel estimation matrix on the reference subcarrier, calibration UE of the base station and a calibration subcarrier corresponding to the calibration UE from the reference UE and the reference subcarrier corresponding to the reference UE, and obtains an uplink channel estimation matrix on the calibration subcarrier corresponding to the calibration UE.

It should be noted herein that, there are multiple reference UEs, and these reference UEs may send uplink reference signals to the base station by using reference subcarriers, and the base station needs to select the calibration UE from all the reference UEs. If the reference UE sends the uplink reference signal to the base station by using one antenna, the base station calculates uplink channel quality of the reference subcarrier according to the uplink channel estimation matrix, selects, from the reference subcarrier, a reference subcarrier whose uplink channel quality exceeds a preset threshold as the calibration subcarrier, and uses UE corresponding to the calibration subcarrier as the calibration UE of the base station. If the reference UE sends the uplink reference signal to the base station by using multiple antennas, the base station further needs to select a calibration antenna. The base station calculates uplink channel quality of the reference subcarrier according to the uplink channel estimation matrix, selects, from the reference subcarrier, a reference subcarrier whose uplink channel quality exceeds a preset threshold as the calibration subcarrier, uses UE corresponding to the calibration subcarrier as the calibration UE of the base station, and uses an antenna corresponding to the calibration subcarrier as a calibration antenna of the base station. After determining the calibration UE, the base station may obtain the uplink channel estimation matrix on the calibration subcarrier corresponding to the calibration UE.

Optionally, herein, only the calibration subcarrier and the calibration UE corresponding to the calibration subcarrier may be determined, and the uplink channel estimation matrix corresponding to the calibration subcarrier is not selected; instead, the calibration UE sends the uplink channel reference signal to the base station again, so that the base station obtains a more accurate uplink channel estimation matrix by means of calculation. After the more accurate uplink channel estimation matrix is obtained, step 303 is performed.

304. The base station obtains, by means of calculation according to the uplink channel estimation matrix on the calibration subcarrier corresponding to the calibration UE, a precoding vector corresponding to the calibration subcarrier of each base station.

The present invention provides two methods for reciprocity calibration between base stations. Corresponding to the two methods, there are two formulas for calculating, by the base station, the precoding vector p corresponding to the calibration subcarrier of each base station: $P=h_{UL}*/\|h_{UL}\|$, where $h_{UL}$ is the uplink channel estimation matrix corresponding to the calibration subcarrier; or $p=c \cdot h_{UL}*/\|h_{UL}\|^2$.

305. The base station obtains a downlink user-dedicated reference signal by performing multiple-antenna weighting according to the precoding vector corresponding to the calibration subcarrier, and sends, by using the calibration subcarrier, the downlink user-dedicated reference signal of a cell corresponding to each base station to the UE.

Generally, one base station covers multiple cells, and during reciprocity calibration between base stations, reciprocity calibration is actually performed on cells corresponding to the base stations. Exemplarily, when reciprocity calibration is being performed for two base stations, one cell is first selected from cells covered by each of the two base stations, and then reciprocity calibration is performed on the two cells for the two base stations. Therefore, the base station sends, by using the calibration subcarrier, the downlink user-dedicated reference signal of the cell corresponding to the base station to the UE.

The base station obtains the downlink user-dedicated reference signal after performing multiple-antenna weighting on the precoding vector that is corresponding to the calibration subcarrier and obtained in step 304, and sends the downlink user-dedicated reference signal of the cell corresponding to the base station to the UE. In this way, the calibration UE may obtain, by means of calculation according to the downlink user-dedicated reference signal, channel matrix information corresponding to the calibration subcarrier of each base station. Mutual orthogonality of downlink user-dedicated reference signals of cells corresponding to base stations includes frequency division orthogonality, time division orthogonality, code division orthogonality, time-frequency orthogonality, time-code orthogonality, frequency-code orthogonality, or time-frequency-code orthogonality.

In addition, if the base station is a serving base station of the calibration UE, the base station sends second indication information to the calibration UE, where the second indication information is used to instruct the calibration UE to receive a calibration subcarrier required for the downlink user-dedicated reference signal; or the indication information is used to instruct the calibration UE to receive a calibration subcarrier and a calibration antenna that are required for the downlink user-dedicated reference signal.

Herein, the base station and another base station may simultaneously send downlink user-dedicated reference signals corresponding to the base stations to the UE, or the base station and another base station may send, at an interval of a preset time, downlink user-dedicated reference signals corresponding to the base stations to the UE, where the preset time is less than a period in which phase shift occurs between the base station and a transceiver of the calibration UE.

306. The base station receives channel matrix information corresponding to the calibration subcarrier and obtains an inter-base station calibration compensation coefficient of the calibration subcarrier by means of calculation according to the channel matrix information corresponding to the calibration subcarrier.

Corresponding to two precoding vector calculation methods that are provided in this embodiment of the present invention and described in step 304, there are also two cases for calculating the inter-base station calibration compensation coefficient of the calibration subcarrier herein.

The first case is: the precoding vector $P = h_{UL}^*/\|h_{UL}\|$, and the base station obtains the inter-base station calibration compensation coefficient $\|=h_{DL}/(p^{T*}h_{UL})$ by means of calculation according to the uplink channel estimation matrix $h_{UL}$ on the calibration subcarrier, the calculated precoding vector p corresponding to the calibration subcarrier, and a received downlink channel estimation matrix $h_{DL}$ that is corresponding to the calibration subcarrier and fed back by the calibration UE. Herein, the calibration UE obtains, by means of calculation according to a received downlink reference signal, the channel matrix information (that is, the downlink channel estimation matrix $h_{DL}$) corresponding to the calibration subcarrier of each base station, and then feeds back the channel matrix to the base station. In this way, the base station obtains the downlink channel estimation matrix $h_{DL}$.

The second case is: the precoding vector $p = c \cdot h_{UL}^*/\|h_{UL}\|^2$, and the base station obtains the inter-base station calibration compensation coefficient $\lambda = q \cdot h_r$ by means of calculation according to a received relative matrix $h_r$ that is corresponding to each subcarrier and fed back by the calibration UE, where $h_r = r \cdot h1/h2$ both r and q are constants, h1 is a downlink channel estimation matrix corresponding to a subcarrier of the base station, and h2 is a downlink channel estimation matrix of the serving base station corresponding to the calibration UE. Herein, the calibration UE obtains, by means of calculation according to a received downlink reference signal, the channel matrix information $h_r$ corresponding to the calibration subcarrier of each base station, and then feeds back the channel matrix $h_r$ to the base station. In this way, the base station obtains the channel matrix $h_r$.

307. The base station adjusts a self-calibration matrix of the calibration subcarrier according to the inter-base station calibration compensation coefficient of the calibration subcarrier.

Herein, the self-calibration matrix of the calibration subcarrier includes a transmit channel self-calibration matrix and a receive channel self-calibration matrix. Therefore, that the base station adjusts the self-calibration matrix according to the inter-base station calibration compensation coefficient includes multiple cases: dividing the transmit channel self-calibration matrix by the inter-base station calibration compensation coefficient; or multiplying the receive channel self-calibration matrix by the inter-base station calibration compensation coefficient; or dividing the transmit channel self-calibration matrix by $\beta$, and multiplying the receive channel self-calibration matrix by $\alpha$, where a product of $\alpha$ and $\beta$ is equal to the inter-base station calibration compensation coefficient.

This embodiment of the present invention provides a method for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

Embodiment 3

Figure 4A:
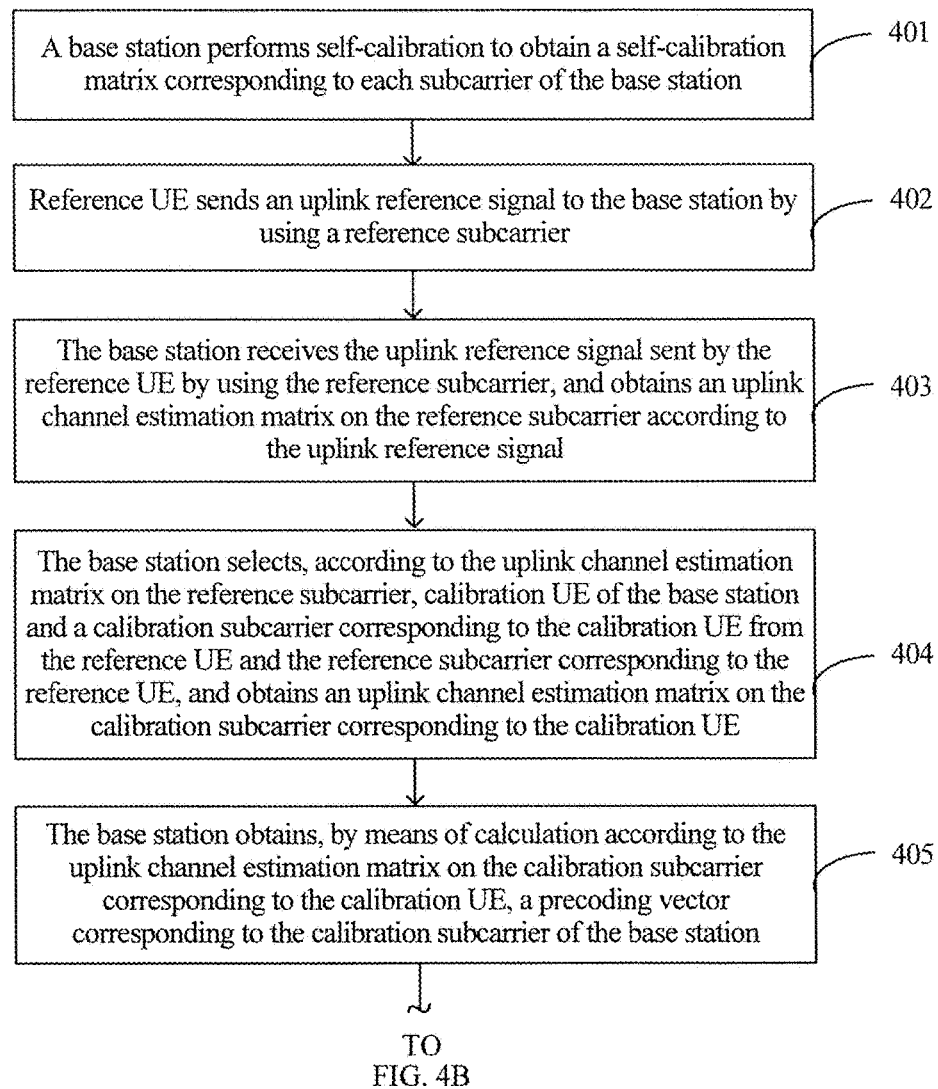
FIG. 4A and FIG. 4B are schematic flowcharts of a method for reciprocity calibration between base stations according to Embodiment 3 of the present invention.
Figure 4B:
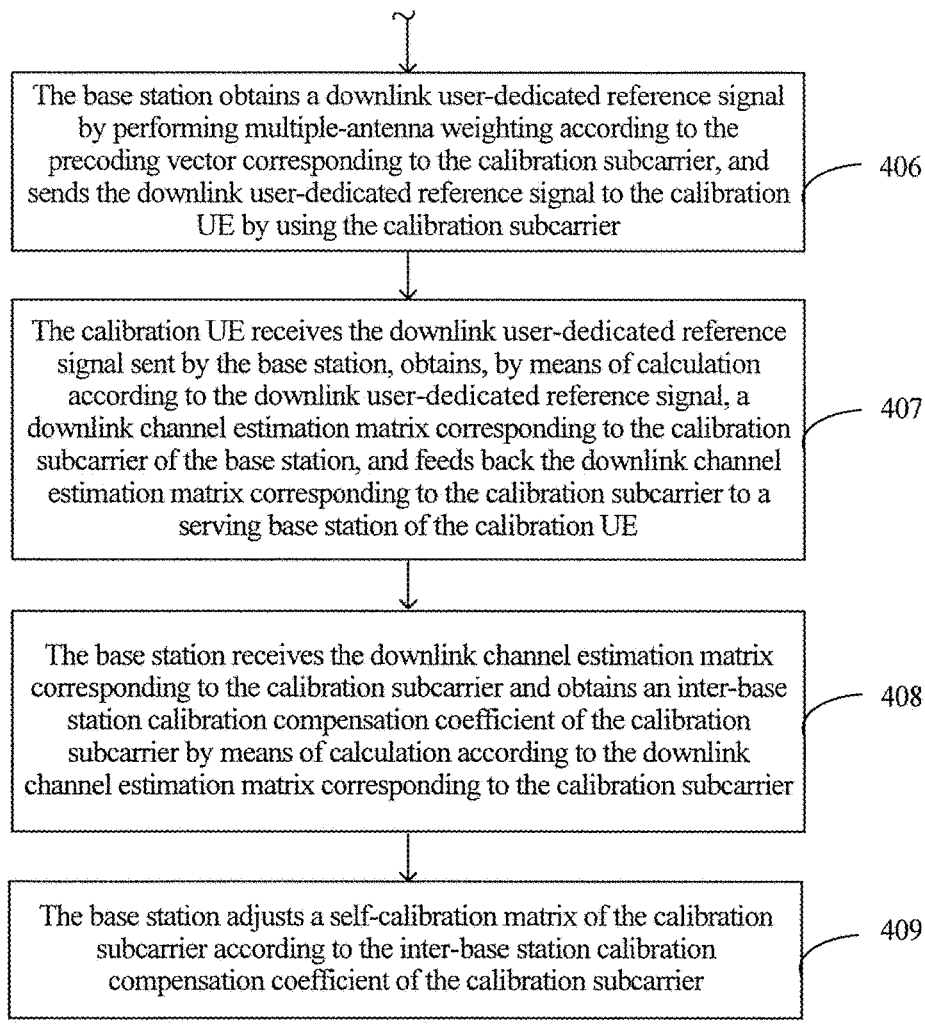
Figure 5A:
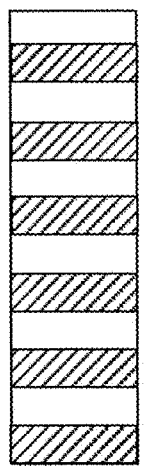
FIG. 5(a) and FIG. 5(b) and FIG. 5(c) and FIG. 5(d) are schematic diagrams of a pilot location according to Embodiment 3 of the present invention.
Figure 5B:
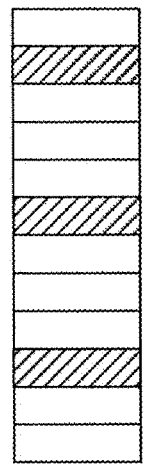
Figure 5C:
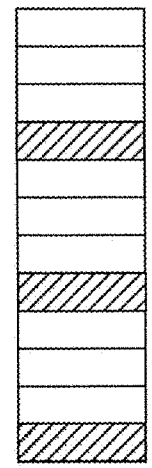
Figure 5D:
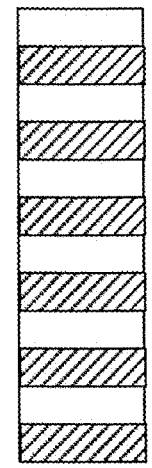

This embodiment of the present invention further provides a method for reciprocity calibration between base stations. As shown in FIG. 4A and FIG. 4B, the method includes the following steps:

401. A base station performs self-calibration to obtain a self-calibration matrix corresponding to each subcarrier of the base station.

For each base station, during reciprocity calibration between base stations, self-calibration of a subcarrier of the base station needs to be first performed, so as to obtain a self-calibration matrix of each subcarrier. A method for obtaining the self-calibration matrix of the base station includes: the base station selects an antenna of the base station as a calibration antenna, the calibration antenna sends a reference signal to another antenna of the base station, and the another antenna of the base station receives and detects the reference signal, so as to obtain a receive channel calibration matrix of the base station; the another antenna of the base station sends another reference signal to the calibration antenna, and the calibration antenna receives and detects the another reference signal, so as to obtain a transmit channel calibration matrix of the base station. In this way, the base station obtains the self-calibration matrix of the base station, that is, the transmit channel calibration matrix and the receive channel calibration matrix.

402. Reference UE sends an uplink reference signal to the base station by using a reference subcarrier.

Herein, the reference UE sends the uplink reference signal to each to-be-calibrated base station by using the reference subcarrier, and the uplink reference signal may be sent to each to-be-calibrated base station by using one or more antennas. When the reference UE sends the uplink reference signal to each to-be-calibrated base station by using multiple antennas, a same uplink reference signal may be alternately sent at different times by using antennas, or different uplink reference signals are simultaneously sent by using antennas. The uplink reference signal may be an SRS (Sounding Reference Signal). A standard SRS signal is on an RB that carries 12 subcarriers, and there is one pilot at an interval of one subcarrier. That the reference signal is an SRS is used as an example for description in the following descriptions.

Herein, a serving base station of the reference UE may send a first indication message to the reference base station, where the first indication message is used to instruct the reference UE to send the SRS signal on a specified RB by using the reference subcarrier. Therefore, if some base stations need to adjust the self-calibration matrix of the subcarrier on some RBs, the serving base station of the reference UE may instruct the reference UE to send the SRS signal to each reference base station on these RBs by using the subcarrier.

403. The base station receives the uplink reference signal sent by the reference UE by using the reference subcarrier, and obtains an uplink channel estimation matrix on the reference subcarrier according to the uplink reference signal.

Exemplarily, if the uplink reference signal SRS received by the base station by using the reference subcarrier occupies four RBs, the base station has eight antennas. As shown in FIG. 5 (a), each RB occupied by the uplink reference signal SRS has six pilot locations (shaded parts in FIG. 5 (a)), and one reference subcarrier is carried at each pilot location. For the reference subcarriers at the six pilot locations on each RB, the base station performs uplink channel estimation on the four RBs, to obtain uplink channel estimation matrices on the reference subcarriers. Then, the base station obtains uplink channel estimation matrices on 24 (6*4=24) reference subcarriers carried on the four RBs. A matrix with eight lines and 24 columns may be used to indicate a channel estimation result obtained by the base station, and an uplink channel estimation matrix $h_{UL}$ on each reference subcarrier may be indicated as a matrix with eight lines and one column.

404. The base station selects, according to the uplink channel estimation matrix on the reference subcarrier, calibration UE of the base station and a calibration subcarrier corresponding to the calibration UE from the reference UE and the reference subcarrier corresponding to the reference UE, and obtains an uplink channel estimation matrix on the calibration subcarrier corresponding to the calibration UE.

If the reference UE sends the uplink reference signal by using one antenna, the base station first calculates uplink channel quality of the reference subcarrier according to the uplink channel estimation matrix; selects, from the reference subcarrier, a reference subcarrier whose uplink channel quality exceeds a preset threshold as the calibration subcarrier; and uses UE corresponding to the calibration subcarrier as the calibration UE of the base station.

If the uplink reference signal sent by the reference UE is sent by using multiple antennas on the reference UE, after selecting the calibration subcarrier and the calibration UE according to the foregoing method, the base station uses an antenna corresponding to the calibration subcarrier as a calibration antenna of the base station.

Exemplarily, corresponding to the uplink reference signal SRS described in step 403, for each reference subcarrier, uplink channel quality of the reference subcarrier is calculated, and the uplink channel estimation matrix $h_{UL}$ on the reference subcarrier is divided by a cardinal corresponding to an interference noise power, so as to obtain uplink channel quality of each reference subcarrier. In this way, the base station selects, from the 24 reference subcarriers carried on the six RBs occupied by the uplink reference signal SRS, a reference subcarrier whose uplink channel quality exceeds a preset threshold as the calibration subcarrier, and uses UE corresponding to the calibration subcarrier as the calibration UE of the base station.

Optionally, after determining the calibration subcarrier and the calibration UE, the base station may not obtain the uplink channel estimation matrix on the calibration subcarrier, but instruct the calibration UE to send an uplink calibration reference signal to the base station again by using the calibration subcarrier, and the base station may obtain an uplink calibration channel estimation matrix $h_{UL}\hat{}$ of the calibration subcarrier according to the uplink calibration reference signal, so as to implement more accurate adjustment of the self-calibration matrix of the reference subcarrier.

405. The base station obtains, by means of calculation according to the uplink channel estimation matrix on the calibration subcarrier corresponding to the calibration UE, a precoding vector corresponding to the calibration subcarrier of the base station.

After the calibration subcarrier and the calibration UE are determined in step 404, uplink channel estimation matrices on all reference subcarriers (including the calibration subcarrier) are obtained in step 403, and therefore, the base station obtains the uplink channel estimation matrix on the calibration subcarrier, and then obtains the precoding vector of the calibration subcarrier by means of calculation. Herein, the precoding vector of the calibration subcarrier $P=h_{UL}*/\|h_{UL}\|$, where $h_{UL}$ is the uplink channel estimation matrix corresponding to the calibration subcarrier. Optionally, $h_{UL}$ in the precoding vector calculation formula may also be the uplink calibration channel estimation matrix $h_{UL}\hat{}$ obtained in step 404, so as to implement more accurate adjustment of the self-calibration matrix of the reference subcarrier.

406. The base station obtains a downlink user-dedicated reference signal by performing multiple-antenna weighting according to the precoding vector corresponding to the calibration subcarrier, and sends the downlink user-dedicated reference signal to the calibration UE by using the calibration subcarrier.

Herein, mutual orthogonality of downlink user-dedicated reference signals of cells corresponding to base stations may be frequency division orthogonality, time division orthogonality, code division orthogonality, time-frequency orthogonality, time-code orthogonality, frequency-code orthogonality, or time-frequency-code orthogonality.

Exemplarily, if a base station A and a base station B need to perform calibration on self-calibration matrices of subcarriers of the base station A and the base station B, and the base station A and the base station B select same reference UE as calibration UE, for each RB, a pilot location of a calibration reference signal 1 sent by the base station A is shown in FIG. 5 (b) (a shaded part in the figure), and the base station A performs multiple-antenna weighting on the calibration reference signal 1 by using a precoding vector $P_A$ corresponding to a calibration subcarrier of the base station A; a pilot location of a calibration reference signal sent by the base station B is shown in FIG. 5 (c) (a shaded part in the figure), and the base station B performs multiple-antenna weighting on the calibration reference signal 2 by using a precoding vector $P_B$ corresponding to a calibration subcarrier of the base station B. In this way, a pilot location of the downlink user-dedicated reference signal received by the calibration UE is shown in FIG. 5 (d) (a shaded part in the figure).

When the base station sends the downlink user-dedicated reference signal to the calibration UE by using the calibration subcarrier, if the base station is a serving base station of the calibration UE, the base station further sends second indication information to the calibration UE, where the second indication information is used to instruct the calibration UE to receive a calibration subcarrier required for the downlink user-dedicated reference signal; or the indication information is used to instruct the calibration UE to receive a calibration subcarrier and a calibration antenna that are required for the downlink user-dedicated reference signal, or instructing the calibration UE to receive the downlink user-dedicated reference signal on a specified RB by using the calibration subcarrier.

407. The calibration UE receives the downlink user-dedicated reference signal sent by the base station, obtains, by means of calculation according to the downlink user-dedicated reference signal, a downlink channel estimation matrix corresponding to the calibration subcarrier of the base station, and feeds back the downlink channel estimation matrix corresponding to the calibration subcarrier to a serving base station of the calibration UE.

The calibration UE obtains a downlink channel estimation matrix of each calibration subcarrier of each base station by means of calculation, so that the downlink channel estimation matrix of each base station may be obtained.

Exemplarily, the calibration UE performs channel estimation at a pilot location in FIG. 5 (d) (a shaded part in the figure) by using the received downlink user-dedicated reference signal, and obtains a downlink channel estimation matrix $h_{DL}$ of a subcarrier of the base station by means of calculation. Then, the calibration UE feeds back the downlink channel estimation matrix $h_{DL}$ to the serving base station of the calibration UE. In this case, if the calibration UE is corresponding to N to-be-calibrated base stations, the serving base station of the calibration UE obtains N downlink channel estimation matrices, and then the calibration UE sends the N downlink channel estimation matrices to the serving base station. The downlink channel estimation matrix herein is a quantization result of the downlink channel estimation matrix $h_{DL}$ of each calibration subcarrier corresponding to each base station. For example, if the downlink channel estimation matrix $h_{DL}$ corresponding to each calibration subcarrier of each base station is a matrix with one line and eight columns, and the base station is corresponding to three calibration subcarriers, the downlink channel estimation matrix of the base station is a matrix with three lines and eight columns.

Herein, if the base station is a serving base station of the calibration UE, the base station receives the downlink channel estimation matrix $h_{DL}$ fed back by the calibration UE, and forwards the downlink channel estimation matrix $h_{DL}$ to another base station; if the base station is not a serving base station of the calibration UE, the base station obtains the downlink channel estimation matrix $h_{DL}$ by receiving the downlink channel estimation matrix $h_{DL}$ forwarded by the serving base station of the calibration UE.

408. The base station receives the downlink channel estimation matrix corresponding to the calibration subcarrier and obtains an inter-base station calibration compensation coefficient of the calibration subcarrier by means of calculation according to the downlink channel estimation matrix corresponding to the calibration subcarrier.

The base station obtains the inter-base station calibration compensation coefficient λ by means of calculation according to the uplink channel estimation matrix $h_{UL}$ on the calibration subcarrier, the calculated precoding vector p corresponding to the calibration subcarrier, and the received downlink channel estimation matrix $h_{DL}$ that is corresponding to the calibration subcarrier and fed back by the calibration UE, where $\lambda = h_{DL}/(p^{T*}h_{UL})$. Herein, $h_{DL}$ in a calculation formula of λ may also be the uplink calibration channel estimation matrix $h_{UL}\hat{}$ obtained in step 304. In this way, a final inter-base station calibration compensation coefficient obtained by means of calculation is more accurate, performance of uplink channel estimation is improved, so that air interface calibration precision is improved, and precision of reciprocity calibration between base stations is improved.

409. The base station adjusts a self-calibration matrix of the calibration subcarrier according to the inter-base station calibration compensation coefficient of the calibration subcarrier.

A method for adjusting the self-calibration matrix of the calibration subcarrier includes:

dividing the transmit channel calibration matrix of the base station by λ; or multiplying the receive channel calibration matrix of the base station by λ; or dividing the transmit channel calibration matrix by β and multiplying the receive channel calibration matrix of the base station by α, where $\alpha \times \beta = \lambda$.

This embodiment of the present invention provides a method for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

Figure 6A:
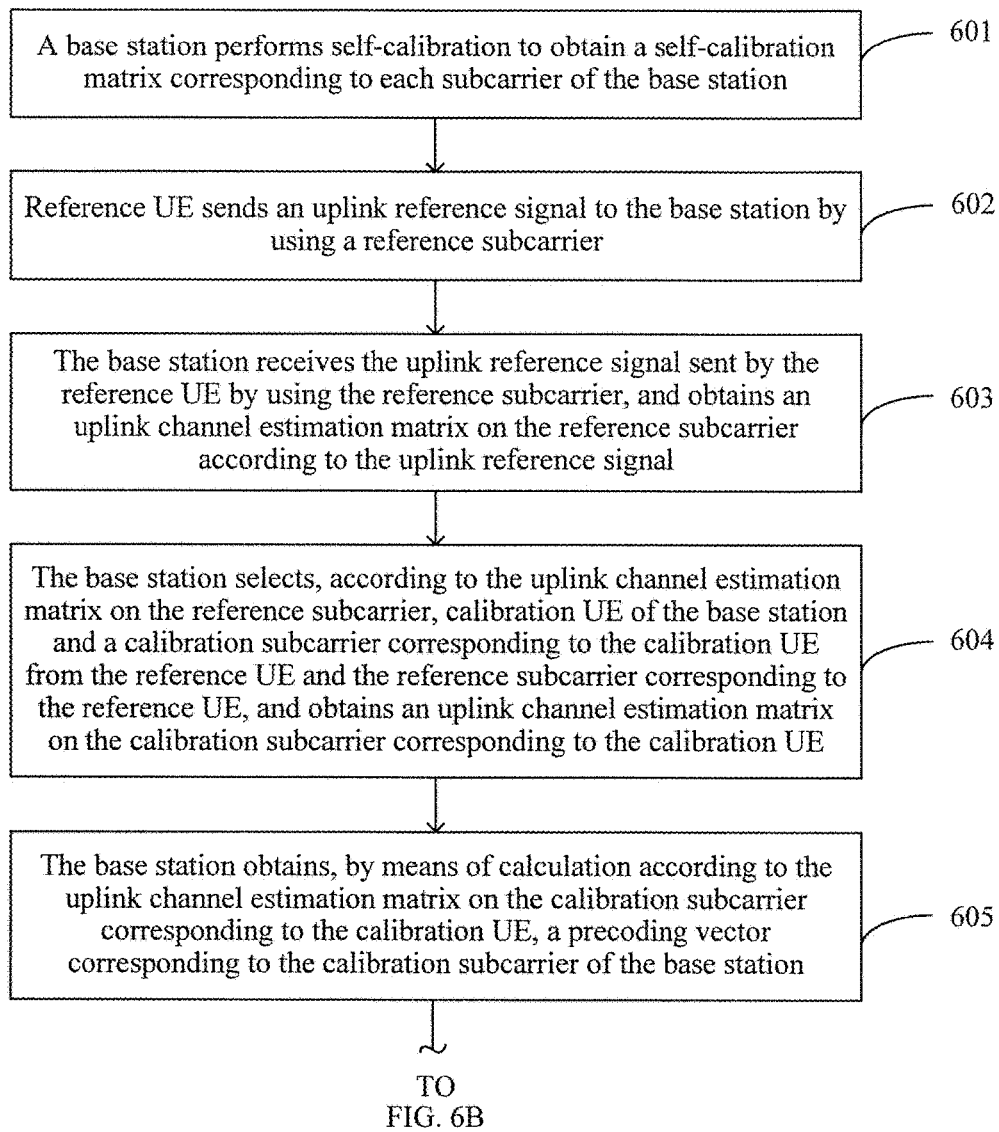

This embodiment of the present invention further provides a method for reciprocity calibration between base stations. As shown in FIG. 6A and FIG. 6B, the method includes the following steps:

601. A base station performs self-calibration to obtain a self-calibration matrix of each subcarrier of the base station.

For each base station, during reciprocity calibration between base stations, self-calibration of each subcarrier of the base station needs to be first performed, so as to obtain a self-calibration matrix of the subcarrier. A method for obtaining the self-calibration matrix of the base station includes: the base station selects an antenna of the base station as a calibration antenna, the calibration antenna sends a reference signal to another antenna of the base station, and the another antenna of the base station receives and detects the reference signal, so as to obtain a receive channel calibration matrix of the base station; the another antenna of the base station sends another reference signal to the calibration antenna, and the calibration antenna receives and detects the another reference signal, so as to obtain a transmit channel calibration matrix of the base station. In this way, the base station obtains the self-calibration matrix of the base station, that is, the transmit channel calibration matrix and the receive channel calibration matrix.

602. Reference UE sends an uplink reference signal to the base station by using a reference subcarrier.

Herein, the reference UE sends the uplink reference signal to each to-be-calibrated base station by using the reference subcarrier, and the uplink reference signal may be sent to each to-be-calibrated base station by using one or more antennas. When the reference UE sends the uplink reference signal to each to-be-calibrated base station by using multiple antennas, a same uplink reference signal may be alternately sent at different times by using antennas, or different uplink reference signals are simultaneously sent by using antennas. The uplink reference signal may be an SRS (Sounding Reference Signal). A standard SRS signal is on an RB that carries 12 subcarriers, and there is one pilot at an interval of one subcarrier. That the reference signal is an SRS is used as an example for description in the following descriptions.

Herein, a serving base station of the reference UE may send a first indication message to the reference base station, where the first indication message is used to instruct the reference UE to send the SRS signal on a specified RB by using the reference subcarrier. Therefore, if some base stations need to adjust the self-calibration matrix of the subcarrier on some RBs, the serving base station of the reference UE may instruct the reference UE to send the SRS signal to each reference base station on these RBs by using the subcarrier.

603. The base station receives the uplink reference signal sent by the reference UE by using the reference subcarrier, and obtains an uplink channel estimation matrix on the reference subcarrier according to the uplink reference signal.

Exemplarily, if the uplink reference signal SRS received by the base station by using the reference subcarrier occupies four RBs, the base station has eight antennas. As shown in FIG. 5 (*a*), each RB occupied by the uplink reference signal SRS has six pilot locations (shaded parts in FIG. 5 (*a*)), and one reference subcarrier is carried at each pilot location. For the reference subcarriers at the six pilot locations on each RB, the base station performs uplink channel estimation on the four RBs, to obtain uplink channel estimation matrices on the reference subcarriers. Then, the base station obtains uplink channel estimation matrices on 24 (6*4=24) reference subcarriers carried on the four RBs. A matrix with eight lines and 24 columns may be used to indicate a channel estimation result obtained by the base station, and an uplink channel estimation matrix $h_{UL}$ on each reference subcarrier may be indicated as a matrix with eight lines and one column.

604. The base station selects, according to the uplink channel estimation matrix on the reference subcarrier, calibration UE of the base station and a calibration subcarrier corresponding to the calibration UE from the reference UE and the reference subcarrier corresponding to the reference UE, and obtains an uplink channel estimation matrix on the calibration subcarrier corresponding to the calibration UE.

If the reference UE sends the uplink reference signal by using one antenna, the base station first calculates uplink channel quality of the reference subcarrier according to the uplink channel estimation matrix; selects, from the reference subcarrier, a reference subcarrier whose uplink channel quality exceeds a preset threshold as the calibration subcarrier; and uses UE corresponding to the calibration subcarrier as the calibration UE of the base station.

If the uplink reference signal sent by the reference UE is sent by using multiple antennas on the reference UE, after selecting the calibration subcarrier and the calibration UE according to the foregoing method, the base station uses an antenna corresponding to the calibration subcarrier as a calibration antenna of the base station.

Exemplarily, corresponding to the uplink reference signal SRS described in step 603, for each reference subcarrier, uplink channel quality of the reference subcarrier is calculated, and the uplink channel estimation matrix $h_{UL}$ on the reference subcarrier is divided by a cardinal corresponding to an interference noise power, so as to obtain uplink channel quality of each reference subcarrier. In this way, the base station selects, from the 24 reference subcarriers carried on the six RBs occupied by the uplink reference signal SRS, a reference subcarrier whose uplink channel quality exceeds a preset threshold as the calibration subcarrier, and uses UE corresponding to the calibration subcarrier as the calibration UE of the base station.

Optionally, after determining the calibration subcarrier and the calibration UE, the base station may not obtain the uplink channel estimation matrix on the calibration subcarrier, but instruct the calibration UE to send an uplink calibration reference signal to the base station again by using the calibration subcarrier, and the base station may obtain an uplink calibration channel estimation matrix $h_{UL}^\wedge$ of the calibration subcarrier according to the uplink calibration reference signal, so as to implement more accurate adjustment of the self-calibration matrix of the reference subcarrier.

605. The base station obtains, by means of calculation according to the uplink channel estimation matrix on the calibration subcarrier corresponding to the calibration UE, a precoding vector corresponding to the calibration subcarrier of each base station.

After the calibration subcarrier and the calibration UE are determined in step 604, uplink channel estimation matrices on all reference subcarriers (including the calibration subcarrier) are obtained in step 603, and therefore, the base station obtains the uplink channel estimation matrix on the calibration subcarrier, and then obtains the precoding vector of the calibration subcarrier by means of calculation. Herein, the precoding vector of the calibration subcarrier $p=c \cdot h_{UL}^*/\|h_{UL}\|^2$, where $h_{UL}$ is the uplink channel estimation matrix corresponding to the calibration subcarrier, c is a constant, and for all base stations, values of c are the same. Optionally, $h_{UL}$ in the precoding vector calculation formula may also be the uplink calibration channel estimation matrix $\hat{h_{UL}}$ obtained in step 604, so as to implement more accurate adjustment of the self-calibration matrix of the reference subcarrier.

606. The base station obtains a downlink user-dedicated reference signal by performing multiple-antenna weighting according to the precoding vector corresponding to the calibration subcarrier, and sends the downlink user-dedicated reference signal to the calibration UE by using the calibration subcarrier.

Herein, the base station and another base station simultaneously send, by using calibration subcarriers, downlink user-dedicated reference signals corresponding to the base stations to the UE; or the base station and another base station send, at an interval of a preset time, downlink user-dedicated reference signals corresponding to the base stations to the UE, where the preset time is less than a period in which phase shift occurs between the base station and a transceiver of the calibration UE. In addition, mutual orthogonality of the downlink user-dedicated reference signals of cells corresponding to the base stations may be frequency division orthogonality, time division orthogonality, code division orthogonality, time-frequency orthogonality, time-code orthogonality, frequency-code orthogonality, or time-frequency-code orthogonality.

Exemplarily, if a base station A and a base station B need to perform calibration on self-calibration matrices of subcarriers of the base station A and the base station B, and the base station A and the base station B select same reference UE as calibration UE, for each RB, a pilot location of a calibration reference signal 1 sent by the base station A is shown in FIG. 5 (*b*) (a shaded part in the figure), and the base station A performs multiple-antenna weighting on the calibration reference signal 1 by using a precoding vector $P_A$ corresponding to a calibration subcarrier of each base station A; a pilot location of a calibration reference signal sent by the base station B is shown in FIG. 5 (*c*) (a shaded part in the figure), and the base station B performs multiple-antenna weighting on the calibration reference signal 2 by using a precoding vector $P_B$ corresponding to a calibration subcarrier of each base station B. In this way, a pilot location of the downlink user-dedicated reference signal received by the calibration UE is shown in FIG. 5 (*d*) (a shaded part in the figure).

When the base station sends the downlink user-dedicated reference signal to the calibration UE by using the calibration subcarrier, if the base station is a serving base station of the calibration UE, the base station further sends second indication information to the calibration UE, where the second indication information is used to instruct the calibration UE to receive a calibration subcarrier required for the downlink user-dedicated reference signal; or the indication information is further used to instruct the calibration UE to receive a calibration subcarrier and a calibration antenna that are required for the downlink user-dedicated reference signal, or instructing the calibration UE to receive the downlink user-dedicated reference signal on a specified RB by using the calibration subcarrier. In addition, the second indication information need to carry indication about a relative channel, so that the calibration UE feeds back information about relative channels among all to-be-calibrated base stations corresponding to the calibration UE to the base station. For example, the indication about the relative channel is used to indicate that the calibration UE is corresponding to two to-be-calibrated base stations, and instruct the calibration UE to feed back information about a relative channel between the two different to-be-calibrated base stations.

607. The calibration UE receives the downlink user-dedicated reference signal sent by the base station, and obtains, by means of calculation according to the downlink user-dedicated reference signal, a downlink channel estimation matrix corresponding to the calibration subcarrier of each base station.

Exemplarily, the calibration UE performs channel estimation at a pilot location in FIG. 5 (*d*) (a shaded part in the figure) by using the received downlink user-dedicated reference signal, and obtains a downlink channel estimation matrix corresponding to each calibration subcarrier of each base station by means of calculation.

608. The calibration UE obtains, by means of calculation according to the downlink channel estimation matrix corresponding to the calibration subcarrier of each base station, a relative matrix corresponding to the calibration subcarrier of each base station, and feeds back the relative matrix to a serving base station of the calibration UE.

Herein, the calibration UE first selects one base station from the to-be-calibrated base stations corresponding to the calibration UE as a reference base station (it is assumed that a downlink channel estimation matrix of the reference base station is h2), and then on each subcarrier, a downlink channel estimation matrix h1 of the base station is divided by the downlink channel estimation matrix h2 of the reference base station, and then multiplies by a constant, to obtain the relative matrix $h_r$ of the base station, that is, $h_r = r \cdot h1/h2$, where r is a constant, and may be used to adjust a value range of a relative channel between different reference base stations. Herein, if the calibration UE is corresponding to N to-be-calibrated base stations, the calibration UE obtains N downlink channel estimation matrices, and then sends N−1 downlink channel estimation matrices to the serving base station of the calibration UE. If the reference base station is a serving base station of the calibration UE, the reference base station forwards, after receiving the relative matrix sent by the calibration UE, the downlink channel estimation matrix to another to-be-calibrated base station corresponding to the calibration UE; if the reference base station is not a serving base station of the calibration UE, the serving base station forwards the downlink channel estimation matrix to each base station, except the reference base station, in the to-be-calibrated base stations corresponding to the calibration UE.

609. The base station receives the relative matrix corresponding to the calibration subcarrier and obtains an inter-base station calibration compensation coefficient of the calibration subcarrier by means of calculation according to the relative matrix corresponding to the calibration subcarrier.

The base station obtains the inter-base station calibration compensation coefficient $\lambda = q \cdot h_r$ by means of calculation according to the received relative matrix $h_r$ that is corresponding to each subcarrier and fed back by the calibration UE, where q is a constant or may be a complex number, and is used to adjust a value range of the calibration compensation coefficient.

610. The base station adjusts a self-calibration matrix of the calibration subcarrier according to the inter-base station calibration compensation coefficient of the calibration subcarrier.

A method for adjusting the self-calibration matrix of the calibration subcarrier includes:

dividing the transmit channel calibration matrix of the base station by $\lambda$; or multiplying the receive channel calibration matrix of the base station by $\lambda$; or dividing the transmit channel calibration matrix by $\beta$ and multiplying the receive channel calibration matrix of the base station by $\alpha$, where $\alpha \times \beta = \lambda$.

This embodiment of the present invention provides a method for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

Embodiment 4

Figure 7:
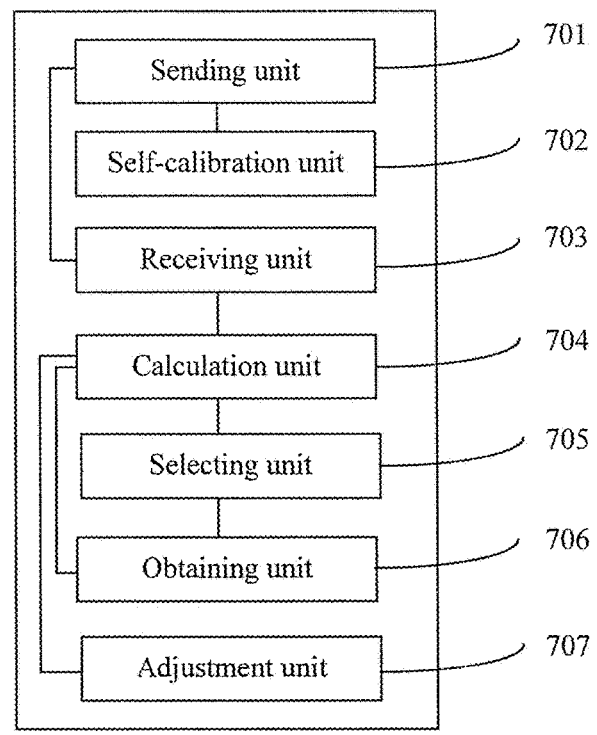
FIG. 7 is a structural block diagram of a base station in a communications system according to Embodiment 4 of the present invention.

This embodiment of the present invention further provides a communications system, including at least two base stations. As shown in FIG. 7, each base station includes a sending unit 701, a self-calibration unit 702, a receiving unit 703, a calculation unit 704, a selecting unit 705, an obtaining unit 706, and an adjustment unit 707.

The calculation unit 704 of each base station is configured to obtain, by means of calculation, a precoding vector corresponding to a selected subcarrier of the base station.

The sending unit 701 of each base station is configured to send, to UE by using selected subcarriers of the base stations, downlink user-dedicated reference signals that are mutually orthogonal between cells corresponding to the base stations, where the downlink user-dedicated reference signal is obtained by means of calculation by each base station by performing multiple-antenna weighting of the base station according to the precoding vector.

The calculation unit 704 of each base station is further configured to obtain an inter-base station calibration compensation coefficient of the selected subcarrier of the base station by means of calculation.

The adjustment unit 707 of each base station is configured to adjust a self-calibration matrix of the selected subcarrier according to the inter-base station calibration compensation coefficient of the selected subcarrier of the base station.

The mutual orthogonality includes frequency division orthogonality, time division orthogonality, code division orthogonality, time-frequency orthogonality, time-code orthogonality, frequency-code orthogonality, or time-frequency-code orthogonality.

The receiving unit 703 of each base station is configured to receive channel matrix information that is corresponding to the selected subcarrier of the base station and obtained by the UE by means of calculation according to the downlink user-dedicated reference signal.

The calculation unit 704 of each base station is specifically configured to obtain, by means of calculation, the inter-base station calibration compensation coefficient of the selected subcarrier of the base station according to the channel matrix information that is corresponding to the selected subcarrier and received by the receiving unit 703.

The sending unit 701 of each base station is specifically configured to simultaneously send the downlink user-dedicated reference signals of the cells corresponding to the base stations to the UE; or the sending unit 701 of each base station is specifically configured to successively send, at an interval of a preset time, the downlink user-dedicated reference signals of the cells corresponding to the base stations to the UE, where the preset time is less than a period in which phase shift occurs between the base station and a transceiver of the UE.

Herein, the UE is calibration UE, the selected subcarrier is a calibration subcarrier corresponding to the calibration UE, and for a base station in the communications system, the self-calibration unit 702 is configured to perform self-calibration to obtain a self-calibration matrix corresponding to each subcarrier of the base station; the receiving unit 703 is configured to receive an uplink reference signal sent by reference user equipment UE by using a reference subcarrier; the calculation unit 704 is configured to: after the receiving unit 703 receives the uplink reference signal sent by the reference user equipment UE by using the reference subcarrier, obtain an uplink channel estimation matrix on the reference subcarrier according to the uplink reference signal received by the receiving unit; the selecting unit 705 is configured to select, according to the uplink channel estimation matrix that is on the reference subcarrier and obtained by the calculation unit 704, the calibration UE of the base station and the calibration subcarrier corresponding to the calibration UE from the reference UE and the reference subcarrier corresponding to the reference UE; the obtaining unit 706 is configured to: after the selecting unit 705 selects the calibration UE of the base station and the calibration subcarrier corresponding to the calibration UE, obtain, from the uplink channel estimation matrix that is on the reference subcarrier and obtained by the calculation unit 704 by means of calculation, an uplink channel estimation matrix on the calibration subcarrier corresponding to the calibration UE; the calculation unit 704 is further configured to obtain, by means of calculation according to the uplink channel estimation matrix on the calibration subcarrier corresponding to the calibration UE, a precoding vector corresponding to the calibration subcarrier of each base station; and the obtaining unit 706 is further configured to obtain the downlink user-dedicated reference signal by performing multiple-antenna weighting according to the precoding vector that is corresponding to the calibration subcarrier and obtained by the calculation unit 704.

It should be noted that the self-calibration matrix of the calibration subcarrier includes a transmit channel self-calibration matrix and a receive channel self-calibration matrix. The adjustment unit 707 is specifically configured to divide the transmit channel self-calibration matrix by the inter-base station calibration compensation coefficient; the adjustment unit 707 is further configured to multiply the receive channel self-calibration matrix by the inter-base station calibration compensation coefficient; or the adjustment unit 707 is further configured to divide the transmit channel self-calibration matrix by $\beta$, and multiply the receive channel self-calibration matrix by α, where a product of α and β is equal to the inter-base station calibration compensation coefficient.

The calculation unit 704 is further configured to calculate uplink channel quality of the reference subcarrier according to the uplink channel estimation matrix; the selecting unit 705 is specifically configured to: when the reference UE sends the uplink reference signal by using one antenna on the reference UE, select, from the reference subcarrier, a reference subcarrier whose uplink channel quality that is obtained by the calculation unit 704 exceeds a preset threshold as the calibration subcarrier, and select UE corresponding to the calibration subcarrier as the calibration UE of the base station; or the selecting unit 705 is specifically configured to: when the reference UE sends the uplink reference signal by using multiple antennas on the reference UE, select, from the reference subcarrier, a reference subcarrier whose uplink channel quality that is obtained by the calculation unit 704 exceeds a preset threshold as the calibration subcarrier, select UE corresponding to the calibration subcarrier as the calibration UE of the base station, and select an antenna corresponding to the calibration subcarrier as a calibration antenna of the base station.

If the base station is a serving base station of the calibration UE, the sending unit 701 is further configured to: before the receiving unit 703 receives the uplink reference signal sent by the reference UE by using the reference subcarrier, send a first indication message to the reference UE, where the first indication message instructs the reference UE to send the uplink reference signal on a specified reference subcarrier to a to-be-calibrated base station; and the sending unit 701 is further configured to: before sending the downlink user-dedicated reference signal to the calibration UE by using the calibration subcarrier, send second indication information to the calibration UE, where the second indication information is used to instruct the calibration UE to receive a calibration subcarrier required for the downlink user-dedicated reference signal; or the indication information is used to instruct the calibration UE to receive a calibration subcarrier and a calibration antenna that are required for the downlink user-dedicated reference signal.

The calculation unit 704 is configured to calculate, by using $P=h_{UL}*/\|h_{UL}\|$ according to the uplink channel estimation matrix $h_{UL}$ that is corresponding to the calibration subcarrier and obtained by means of calculation, the precoding vector p corresponding to the calibration subcarrier; the receiving unit 703 is configured to receive a downlink channel estimation matrix $h_{DL}$ that is corresponding to the calibration subcarrier and fed back by the calibration UE; and the calculation unit 704 is configured to obtain, by means of calculation by using $\lambda=h_{DL}/(p^T*h_{UL})$, the inter-base station calibration compensation coefficient of the calibration subcarrier according to the uplink channel estimation matrix $h_{UL}$ that is on the calibration subcarrier and obtained by means of calculation, the precoding vector p that is corresponding to the calibration subcarrier and obtained by means of calculation, and the downlink channel estimation matrix $h_{DL}$ that is corresponding to the calibration subcarrier, received by the receiving unit 703, and fed back by the calibration UE.

The receiving unit 703 is further configured to: after receiving the channel matrix information corresponding to the calibration subcarrier, receive an uplink calibration reference signal sent by the calibration UE by using the calibration subcarrier; the calculation unit 704 is configured to obtain, by means of calculation according to the uplink calibration reference signal, an uplink calibration channel estimation matrix $\hat{h}_{UL}$ corresponding to the calibration subcarrier; the receiving unit 703 is configured to receive a downlink channel estimation matrix $h_{DL}$ that is corresponding to the calibration subcarrier and fed back by the calibration UE; and the calculation unit 704 is further configured to obtain, by means of calculation by using $\lambda=h_{DL}/(p^T*\hat{h}_{UL})$, the inter-base station calibration compensation coefficient of the calibration subcarrier according to the uplink channel estimation matrix $\hat{h}_{UL}$ that is on the calibration subcarrier and obtained by means of calculation, the precoding vector p that is corresponding to the calibration subcarrier and obtained by means of calculation, and the downlink channel estimation matrix $h_{DL}$ that is corresponding to the calibration subcarrier, received by the receiving unit 703, and fed back by the calibration UE.

The calculation unit 704 is configured to calculate, by using $p=c \cdot h_{UL}*/\|h_{UL}\|^2$ according to the uplink channel estimation matrix $h_{UL}$ that is corresponding to the calibration subcarrier and obtained by means of calculation, the precoding vector p corresponding to the calibration subcarrier; the receiving unit 703 is configured to receive a relative matrix $h_r$ that is corresponding to the calibration subcarrier and fed back by the calibration UE, where $h_r=r \cdot h1/h2$, r is a constant, h1 is a downlink channel estimation matrix corresponding to a subcarrier of the base station, and h2 is a downlink channel estimation matrix of a serving base station corresponding to the calibration UE; and the calculation unit 704 is configured to obtain, by means of calculation by using $\lambda=q \cdot h_r$, the inter-base station calibration compensation coefficient of the calibration subcarrier according to the relative matrix $h_r$ that is corresponding to the calibration subcarrier, received by the receiving unit 703, and fed back by the calibration UE.

If the base station is a serving base station of the calibration UE, the receiving unit 703 is configured to receive channel matrix information that is corresponding to the calibration subcarrier of the serving base station and sent by the calibration UE, and channel matrix information corresponding to a calibration subcarrier of another base station; and the sending unit 701 is further configured to: after the receiving unit receives the channel matrix information corresponding to the calibration subcarrier of the another base station, correspondingly forward the channel matrix information corresponding to the calibration subcarrier of the another base station to the another base station.

If the base station is not a serving base station of the calibration UE, the receiving unit 703 is configured to receive channel matrix information that is corresponding to the calibration subcarrier of each base station and forwarded by the serving base station of the calibration UE.

Figure 8:
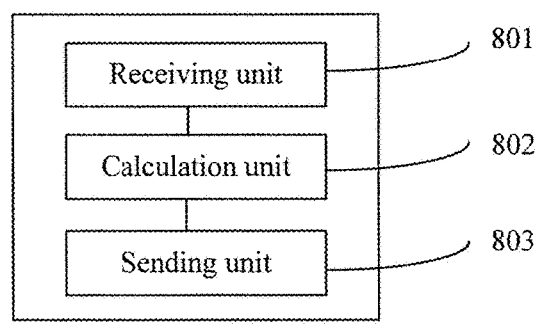
FIG. 8 is a structural block diagram of user equipment UE according to Embodiment 4 of the present invention.

This embodiment of the present invention further provides user equipment UE. As shown in FIG. 8, the UE includes a receiving unit 801, a calculation unit 802, and a sending unit 803; where:

the receiving unit 801 is configured to receive downlink user-dedicated reference signals that are mutually orthogonal between cells corresponding to all base stations and sent by the base stations by using selected subcarriers;

the calculation unit 802 is configured to obtain, by means of calculation according to the downlink user-dedicated reference signal received by the receiving unit 801, channel matrix information corresponding to the selected subcarrier of each base station; and the sending unit 803 is configured to send the channel matrix information that is corresponding to the selected subcarrier of the base station and obtained by the calculation unit 802 to a serving base station of the UE.

Herein, the UE is calibration UE, the selected subcarrier is a calibration subcarrier corresponding to the calibration UE, and the calculation unit 802 is specifically configured to obtain, by means of calculation according to the downlink user-dedicated reference signal received by the receiving unit 801, a downlink channel estimation matrix $h_{DL}$ to the calibration subcarrier of each base station.

As described above, the UE is calibration UE, and the selected subcarrier is a calibration subcarrier corresponding to the calibration UE; the calculation unit 802 is configured to obtain, by means of calculation according to the downlink user-dedicated reference signal received by the receiving unit 801, a downlink channel estimation matrix corresponding to the calibration subcarrier of each base station; and the calculation unit 802 is further configured to: for each base station except the serving base station of the calibration UE, obtain, by means of calculation by using $h_r=r \cdot h1/h2$ according to the downlink channel estimation matrix that is corresponding to the calibration subcarrier of each base station and obtained by means of calculation, a relative matrix $h_r$ corresponding to the calibration subcarrier of each base station, where r is a constant, h1 is a downlink channel estimation matrix corresponding to a subcarrier of the base station, and h2 is a downlink channel estimation matrix of the serving base station corresponding to the calibration UE.

This embodiment of the present invention provides an apparatus for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

Embodiment 5

Figure 9:
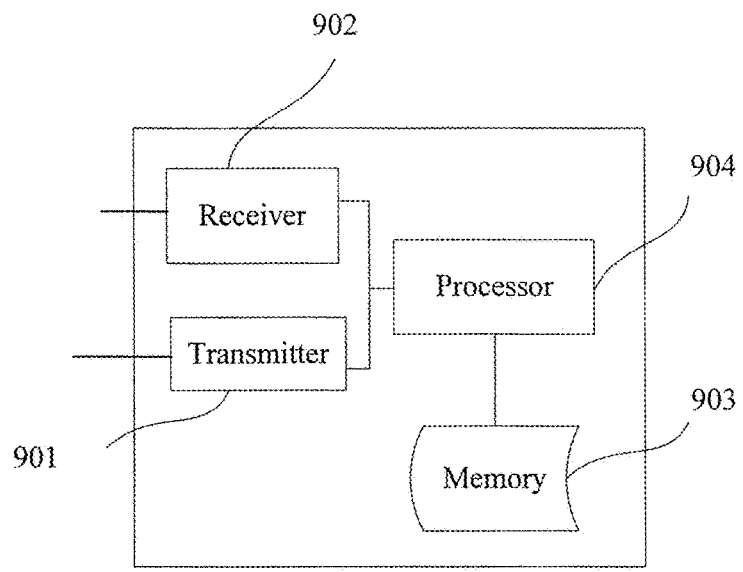
FIG. 9 is a structural block diagram of a base station in a communications system according to Embodiment 5 of the present invention.

This embodiment of the present invention provides a communications system, including two base stations. In hardware implementation, the sending unit described in FIG. 7 may be a transmitter or a transceiver, the receiving unit may be a receiver or a transceiver, and the sending unit and the receiving unit may be integrated to form a transceiver unit, which is a transceiver corresponding to hardware implementation. The sending unit, the self-calibration unit, the receiving unit, the calculation unit, the selecting unit, the obtaining unit, and the adjustment unit may be built in a processor of the base station in a hardware form or a software form. The processor may be a central processing unit (CPU), or may be a single-chip microcomputer. For a base station in the communications system, as shown in FIG. 9, each base station includes a transmitter 901, a receiver 902, a memory 903, and a processor 904 that is separately connected to the transmitter 901, the receiver 902, and the memory 903. Certainly, the base station may further include a general component, such as a baseband processing component, an intermediate radio frequency processing component, or an input and output apparatus, which is not limited in this embodiment of the present invention. The memory 903 stores a group of program code, and the processor 904 is configured to invoke the program code stored in the memory 903, to perform the following operations:

the processor 904 is configured to obtain, by means of calculation, a precoding vector corresponding to a selected subcarrier of the base station;

the processor 904 is configured to send, to UE by using selected subcarriers of the base stations and by using the transmitter 901, downlink user-dedicated reference signals that are mutually orthogonal between cells corresponding to the base stations, where the downlink user-dedicated reference signal is obtained by means of calculation by each base station by performing multiple-antenna weighting of the base station according to the precoding vector;

the processor 904 is configured to obtain an inter-base station calibration compensation coefficient of the selected subcarrier of the base station by means of calculation; and the processor 904 is configured to adjust a self-calibration matrix of the selected subcarrier according to the inter-base station calibration compensation coefficient of the selected subcarrier of the base station.

The mutual orthogonality includes frequency division orthogonality, time division orthogonality, code division orthogonality, time-frequency orthogonality, time-code orthogonality, frequency-code orthogonality, or time-frequency-code orthogonality.

The processor 904 is configured to receive, by using the receiver 902, channel matrix information that is corresponding to the selected subcarrier of the base station and obtained by the UE by means of calculation according to the downlink user-dedicated reference signal.

The processor 904 is specifically configured to obtain the inter-base station calibration compensation coefficient of the selected subcarrier of the base station by means of calculation according to the channel matrix information corresponding to the selected subcarrier.

The processor 904 is configured to simultaneously send, by using the transmitter 901 of each base station, the downlink user-dedicated reference signals of the cells corresponding to the base stations to the UE; or the processor 904 is configured to successively send, at an interval of a preset time by using the transmitter 901 of each base station, the downlink user-dedicated reference signals of the cells corresponding to the base stations to the UE, where the preset time is less than a period in which phase shift occurs between the base station and a transceiver of the UE.

Herein, the UE is calibration UE, the selected subcarrier is a calibration subcarrier corresponding to the calibration UE, and for a base station in the communications system, the processor 904 performs self-calibration to obtain a self-calibration matrix corresponding to each subcarrier of the base station; the processor 904 is configured to receive, by using the receiver 902, an uplink reference signal sent by reference user equipment UE by using a reference subcarrier; the processor 904 is configured to: after the receiver 902 receives the uplink reference signal sent by the reference user equipment UE by using the reference subcarrier, obtain an uplink channel estimation matrix on the reference subcarrier according to the uplink reference signal received by the receiver 902; the processor 904 is configured to select, according to the obtained uplink channel estimation matrix on the reference subcarrier, the calibration UE of the base station and the calibration subcarrier corresponding to the calibration UE from the reference UE and the reference subcarrier corresponding to the reference UE; the processor 904 is configured to: after selecting the calibration UE of the base station and the calibration subcarrier corresponding to the calibration UE, obtain, from the obtained uplink channel estimation matrix on the reference subcarrier, an uplink channel estimation matrix on the calibration subcarrier corresponding to the calibration UE; the processor 904 is further configured to obtain, by means of calculation according to the uplink channel estimation matrix on the calibration subcarrier corresponding to the calibration UE, a precoding vector corresponding to the calibration subcarrier of each base station; and the processor 904 is further configured to obtain the downlink user-dedicated reference signal by performing multiple-antenna weighting according to the obtained precoding vector corresponding to the calibration subcarrier.

It should be noted that the self-calibration matrix of the calibration subcarrier includes a transmit channel self-calibration matrix and a receive channel self-calibration matrix. The processor 904 is specifically configured to divide the transmit channel self-calibration matrix by the inter-base station calibration compensation coefficient; the processor 904 is further configured to multiply the receive channel self-calibration matrix by the inter-base station calibration compensation coefficient; or the processor 904 is further configured to divide the transmit channel self-calibration matrix by $\beta$, and multiply the receive channel self-calibration matrix by $\alpha$, where a product of $\alpha$ and $\beta$ is equal to the inter-base station calibration compensation coefficient.

The processor 904 is further configured to calculate uplink channel quality of the reference subcarrier according to the uplink channel estimation matrix; the processor 904 is specifically configured to: when the reference UE sends the uplink reference signal by using one antenna on the reference UE, select, from the reference subcarrier, a reference subcarrier whose obtained uplink channel quality exceeds a preset threshold as the calibration subcarrier, and select UE corresponding to the calibration subcarrier as the calibration UE of the base station; or the processor 904 is specifically configured to: when the reference UE sends the uplink reference signal by using multiple antennas on the reference UE, select, from the reference subcarrier, a reference subcarrier whose obtained uplink channel quality exceeds a preset threshold as the calibration subcarrier, select UE corresponding to the calibration subcarrier as the calibration UE of the base station, and select an antenna corresponding to the calibration subcarrier as a calibration antenna of the base station.

If the base station is a serving base station of the calibration UE, the processor 904 is further configured to: before the receiver 902 receives the uplink reference signal sent by the reference UE by using the reference subcarrier, send a first indication message to the reference UE by using the transmitter 901, where the first indication message instructs the reference UE to send the uplink reference signal on a specified reference subcarrier to a to-be-calibrated base station; and the processor 904 is further configured to: before sending the downlink user-dedicated reference signal to the calibration UE by using the calibration subcarrier, send second indication information to the calibration UE, where the second indication information is used to instruct the calibration UE to receive a calibration subcarrier required for the downlink user-dedicated reference signal; or the indication information is used to instruct the calibration UE to receive a calibration subcarrier and a calibration antenna that are required for the downlink user-dedicated reference signal.

The processor 904 is configured to calculate, by using $P=h_{UL}^*/\|h_{UL}\|$ according to the uplink channel estimation matrix $h_{UL}$ that is corresponding to the calibration subcarrier and obtained by means of calculation, the precoding vector p corresponding to the calibration subcarrier; the receiver 902 is configured to receive a downlink channel estimation matrix $h_{DL}$ that is corresponding to the calibration subcarrier and fed back by the calibration UE; and the processor 904 is configured to obtain, by means of calculation by using $\lambda=h_{DL}/(p^T*h_{UL})$, the inter-base station calibration compensation coefficient of the calibration subcarrier according to the uplink channel estimation matrix $h_{UL}$ that is on the calibration subcarrier and obtained by means of calculation, the precoding vector p that is corresponding to the calibration subcarrier and obtained by means of calculation, and the downlink channel estimation matrix $h_{DL}$ that is corresponding to the calibration subcarrier, received by the receiver 902, and fed back by the calibration UE.

The receiver 902 is further configured to: after receiving the channel matrix information corresponding to the calibration subcarrier, receive an uplink calibration reference signal sent by the calibration UE by using the calibration subcarrier; the processor 904 is configured to obtain, by means of calculation according to the uplink calibration reference signal, an uplink calibration channel estimation matrix $h_{UL}\hat{}$ corresponding to the calibration subcarrier; the processor 904 is configured to receive, by using the receiver 902, a downlink channel estimation matrix $h_{DL}$ that is corresponding to the calibration subcarrier and fed back by the calibration UE; and the processor 904 is further configured to obtain, by means of calculation by using $\lambda=h_{DL}/(p^T*h_{UL}\hat{})$, the inter-base station calibration compensation coefficient of the calibration subcarrier according to the uplink channel estimation matrix $h_{UL}\hat{}$ that is on the calibration subcarrier and obtained by means of calculation, the precoding vector p that is corresponding to the calibration subcarrier and obtained by means of calculation, and the downlink channel estimation matrix $h_{DL}$ that is corresponding to the calibration subcarrier, received by the receiver 902, and fed back by the calibration UE.

The processor 904 is configured to calculate, by using $p=c \cdot h_{UL}^*/\|h_{UL}\|^2$ according to the uplink channel estimation matrix $h_{UL}$ that is corresponding to the calibration subcarrier and obtained by means of calculation, the precoding vector p corresponding to the calibration subcarrier; the processor 904 is configured to receive, by using the receiver 902, a relative matrix $h_r$ that is corresponding to the calibration subcarrier and fed back by the calibration UE, where $h_r = r \cdot h1/h2$, r is a constant, h1 is a downlink channel estimation matrix corresponding to a subcarrier of the base station, and h2 is a downlink channel estimation matrix of the serving base station corresponding to the calibration UE; and the processor 904 is configured to obtain, by means of calculation by using $\lambda=q \cdot h_r$, the inter-base station calibration compensation coefficient of the calibration subcarrier according to the relative matrix $h_r$ that is corresponding to the calibration subcarrier, received by the receiver 902, and fed back by the calibration UE.

If the base station is a serving base station of the calibration UE, the processor 904 is configured to receive, by using the receiver 902, channel matrix information that is corresponding to the calibration subcarrier of the serving base station and sent by the calibration UE, and channel matrix information corresponding to a calibration subcarrier of another base station; and the processor 904 is further configured to: after the receiver 902 receives the channel matrix information corresponding to the calibration subcarrier of the another base station, correspondingly forward, by using the transmitter 901, the channel matrix information corresponding to the calibration subcarrier of the another base station to the another base station.

If the base station is not a serving base station of the calibration UE, the processor 904 is configured to receive, by using the receiver 902, channel matrix information that is corresponding to the calibration subcarrier of each base station and forwarded by the serving base station of the calibration UE.

Figure 10:
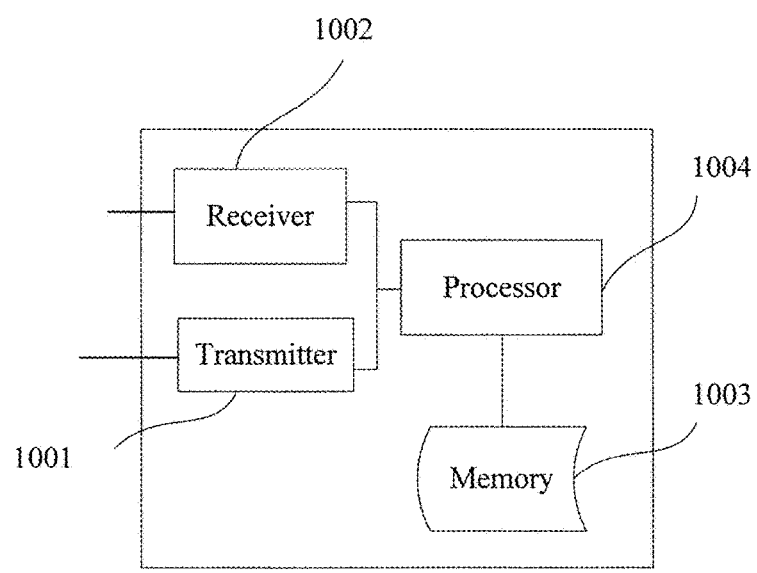
FIG. 10 is a structural block diagram of user equipment UE according to Embodiment 5 of the present invention.

This embodiment of the present invention provides user equipment UE. In hardware implementation, the sending unit described in FIG. 8 may be a transmitter or a transceiver, the receiving unit may be a receiver or a transceiver, and the sending unit and the receiving unit may be integrated to form a transceiver unit, which is a transceiver corresponding to hardware implementation. The calculation unit may be built in a processor of a base station in a hardware form or a software form. The processor may be a central processing unit (CPU), or may be a single-chip microcomputer. For a base station in the communications system, as shown in FIG. 10, each base station includes a transmitter 1001, a receiver 1002, a memory 1003, and a processor 1004 that is separately connected to the transmitter 1001, the receiver 1002, and the memory 1003. Certainly, the base station may further include a general component, such as a baseband processing component, an intermediate radio frequency processing component, or an input and output apparatus, which is not limited in this embodiment of the present invention. The memory 1003 stores a group of program code, and the processor 1004 is configured to invoke the program code stored in the memory 1003, to perform the following operations:

the processor 1004 is configured to receive, by using the receiver 1002, downlink user-dedicated reference signals that are mutually orthogonal between cells corresponding to all base stations and sent by the base stations by using selected subcarriers; the processor 1004 is configured to obtain, by means of calculation according to the received downlink user-dedicated reference signal, channel matrix information corresponding to the selected subcarrier of each base station; and the processor 1004 is configured to send, by using the transmitter 1001, the channel matrix information corresponding to the selected subcarrier of the base station to a serving base station of the UE.

Herein, the UE is calibration UE, the selected subcarrier is a calibration subcarrier corresponding to the calibration UE, and the processor 1004 is specifically configured to obtain, by means of calculation according to the downlink user-dedicated reference signal received by the receiver 1002, a downlink channel estimation matrix $h_{DL}$ corresponding to the calibration subcarrier of each base station.

As described above, the UE is calibration UE, and the selected subcarrier is a calibration subcarrier corresponding to the calibration UE; the processor 1004 is configured to obtain, by means of calculation according to the downlink user-dedicated reference signal received by the receiver 1002, a downlink channel estimation matrix corresponding to the calibration subcarrier of each base station; and the processor 1004 is further configured to: for each base station except the serving base station of the calibration UE, obtain, by means of calculation by using $h_r = r \cdot h1/h2$ according to the downlink channel estimation matrix that is corresponding to the calibration subcarrier of each base station and obtained by means of calculation, a relative matrix $h_r$ corresponding to the calibration subcarrier of each base station, where r is a constant, h1 is a downlink channel estimation matrix corresponding to a subcarrier of the base station, and h2 is a downlink channel estimation matrix of the serving base station corresponding to the calibration UE.

This embodiment of the present invention provides an apparatus for reciprocity calibration between base stations. A base station obtains a downlink user-dedicated reference signal by performing multiple-antenna weighting on a precoding vector corresponding to a selected subcarrier, and sends the downlink user-dedicated reference signal to UE by using the selected subcarrier, so that the UE obtains a channel matrix by means of calculation according to the downlink user-dedicated reference signal. The base station obtains an inter-base station calibration compensation coefficient of the selected subcarrier by means of calculation according to the channel matrix, so that the base station adjusts a self-calibration matrix of the selected subcarrier. In this way, a beam gain obtained after multiple-antenna weighting may be used to obtain a more accurate channel matrix and improve system performance of a channel, so that air interface calibration precision is improved, and precision of reciprocity calibration between base stations is improved.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for reciprocity calibration between base stations, applied to a base station, the method comprising:
    performing, by the base station, self-calibration to obtain a self-calibration matrix corresponding to each subcarrier of the base station;
    receiving, by the base station, an uplink reference signal sent by reference user equipment (UE) by using a reference subcarrier, and obtaining an uplink channel estimation matrix on the reference subcarrier according to the uplink reference signal;
    selecting, by the base station according to the uplink channel estimation matrix on the reference subcarrier, the calibration UE of the base station and the calibration subcarrier corresponding to the calibration UE from the reference UE and the reference subcarrier corresponding to the reference UE, and obtaining an uplink channel estimation matrix on the calibration subcarrier corresponding to the calibration UE;
    obtaining, by the base station by calculating according to the uplink channel estimation matrix on the calibration subcarrier corresponding to the calibration UE, a precoding vector corresponding to the calibration subcarrier of the base station;
    sending, by the base station to UE by using the selected subcarriers of the base station, downlink user-dedicated reference signals that are mutually orthogonal between cells corresponding to the base station, wherein the downlink user-dedicated reference signal is obtained by calculating by the base station by performing multiple-antenna weighting of the base station according to the precoding vector;

obtaining, by the base station, an inter-base station calibration compensation coefficient of the selected subcarrier of the base station;

adjusting, by the base station, a self-calibration matrix of the selected subcarrier according to the inter-base station calibration compensation coefficient of the selected subcarrier of the base station;

wherein, adjusting a self-calibration matrix of the selected subcarrier according to the inter-base station calibration compensation coefficient of the selected subcarrier of the base station comprises:

dividing a transmit channel self-calibration matrix by the inter-base station calibration compensation coefficient, or multiplying, the inter-base station calibration compensation coefficient by a receive channel self-calibration matrix, or dividing the transmit channel self-calibration matrix by $\beta$, and multiplying the receive channel self-calibration matrix by $\alpha$, wherein a product of $\alpha$ and $\beta$ is equal to the inter-base station calibration compensation coefficient; and wherein the UE is a calibration UE, and the selected subcarrier is a calibration subcarrier corresponding to the calibration UE, a self-calibration matrix of the calibration subcarrier comprises a transmit channel self-calibration matrix and a receive channel self-calibration matrix.

2. The method according to claim 1, wherein the mutual orthogonality comprises: frequency division orthogonality, time division orthogonality, code division orthogonality, time-frequency orthogonality, time-code orthogonality, frequency-code orthogonality, or time-frequency-code orthogonality.

3. The method according to claim 1, wherein obtaining, by the base station, an inter-base station calibration compensation coefficient of the selected subcarrier of the base station comprises:

correspondingly receiving, by the base station, channel matrix information that is corresponding to the selected subcarrier of the base station and obtained by the UE by calculating according to the downlink user-dedicated reference signal; and obtaining, by the base station by calculating, the inter-base station calibration compensation coefficient of the selected subcarrier of the base station according to the channel matrix information corresponding to the selected subcarrier.

4. The method according to claim 1, wherein:

a calculation formula of the precoding vector corresponding to the calibration subcarrier comprises:

$p = c \cdot h_{UL}^* / \|h_{UL}\|^2$, wherein c is a constant, and $h_{UL}$ is the uplink channel estimation matrix corresponding to the calibration subcarrier; and obtaining, by the base station by calculating, an inter-base station calibration compensation coefficient of the selected subcarrier of the base station according to channel matrix information corresponding to the calibration subcarrier comprises:

obtaining, by the base station by calculating, the inter-base station calibration compensation coefficient $\lambda = q \cdot h_r$ according to a received relative matrix $h_r$ that is corresponding to each subcarrier and fed back by the calibration UE, wherein q is a constant, $h_r = r \cdot h1/h2$, r is a constant, h1 is a downlink channel estimation matrix corresponding to a subcarrier of the base station, and h2 is a downlink channel estimation matrix of a serving base station corresponding to the calibration UE.

5. The method according to claim 1, wherein:

when the uplink reference signal sent by the reference UE is sent by using one antenna on the reference UE, selecting, by the base station according to the uplink channel estimation matrix on the reference subcarrier, the calibration UE of the base station and the calibration subcarrier corresponding to the calibration UE from the reference UE and the reference subcarrier corresponding to the reference UE comprises:

calculating, by the base station, uplink channel quality of the reference subcarrier according to the uplink channel estimation matrix, and selecting, from the reference subcarrier, a reference subcarrier whose uplink channel quality exceeds a preset threshold as the calibration subcarrier, and using a UE corresponding to the calibration subcarrier as the calibration UE of the base station; and when the uplink reference signal sent by the reference UE is sent by using multiple antennas on the reference UE, selecting, by the base station according to the uplink channel estimation matrix on the reference subcarrier, the calibration UE of the base station and the calibration subcarrier corresponding to the calibration UE from the reference UE and the reference subcarrier corresponding to the reference UE comprises:

calculating, by the base station, uplink channel quality of the reference subcarrier according to the uplink channel estimation matrix, and selecting, from the reference subcarrier, a reference subcarrier whose uplink channel quality exceeds a preset threshold as the calibration subcarrier, using a UE corresponding to the calibration subcarrier as the calibration UE of the base station, and using an antenna corresponding to the calibration subcarrier as a calibration antenna of the base station.

6. The method according to claim 5, wherein:

when the base station is a serving base station of the reference UE, before receiving, by the base station, an uplink reference signal sent by reference UE by using a reference subcarrier, the method further comprises:

sending, by the serving base station, a first indication message to the reference UE, wherein the first indication message is configured to instruct the reference UE to send the uplink reference signal on a specified reference subcarrier to a to-be-calibrated base station; and before sending, by the base station to the UE by using the selected subcarriers of the base station, downlink user-dedicated reference signals that are mutually orthogonal between cells corresponding to the base station, the method further comprises:

sending, by the base station, second indication information to the calibration UE for instructing the calibration UE to receive a calibration subcarrier required for the downlink user-dedicated reference signal; or the indication information is used to instruct the calibration UE to receive a calibration subcarrier and a calibration antenna that are required for the downlink user-dedicated reference signal.

7. The method according to claim 1, wherein:

a calculation formula of the precoding vector corresponding to the calibration subcarrier comprises:

$P=h_{UL}^*/\|h_{UL}\|$, wherein $h_{UL}$ is the uplink channel estimation matrix corresponding to the calibration subcarrier; and obtaining, by the base station by calculating, an inter-base station calibration compensation coefficient of the selected subcarrier of the base station according to channel matrix information corresponding to the calibration subcarrier comprises:

obtaining, by the base station, the inter-base station calibration compensation coefficient $\lambda$ by calculating according to the uplink channel estimation matrix $h_{UL}$ on the calibration subcarrier, the calculated precoding vector p corresponding to the calibration subcarrier, and a received downlink channel estimation matrix $h_{DL}$ that is corresponding to the calibration subcarrier and fed back by the calibration UE, wherein $\lambda=h_{DL}/(p^{T*}h_{UL})$.

8. The method according to claim 7, wherein:

after the base station receives the channel matrix information corresponding to the calibration subcarrier, the method further comprises:

receiving, by the base station, an uplink calibration reference signal sent by the calibration UE by using the calibration subcarrier, and obtaining, according to the uplink calibration reference signal, an uplink calibration channel estimation matrix corresponding to the calibration subcarrier; and obtaining, by the base station by calculating, an inter-base station calibration compensation coefficient of the selected subcarrier of the base station according to channel matrix information corresponding to the calibration subcarrier comprises:

obtaining, by the base station, the inter-base station calibration compensation coefficient $\lambda$ by calculating according to the uplink calibration channel estimation matrix $\hat{h}_{UL}$ on the calibration subcarrier, a calculated precoding vector p corresponding to the calibration subcarrier, and a received downlink channel estimation matrix $h_{DL}$ that is corresponding to the calibration subcarrier and fed back by the calibration UE, wherein $\lambda=h_{DL}/(p^{T*}\hat{h}_{UL})$.

9. The method according to claim 7, wherein:

if the base station is a serving base station of the calibration UE, that the base station receives the channel matrix information corresponding to the calibration subcarrier comprises:

receiving channel matrix information that is corresponding to a calibration subcarrier of the serving base station and that is sent by the calibration UE and channel matrix information corresponding to a calibration subcarrier of another base station; and after the base station receives the channel matrix information corresponding to the calibration subcarrier of the another base station, the method further comprises:

correspondingly forwarding the channel matrix information corresponding to the calibration subcarrier of the another base station to the another base station; and if the base station is not a serving base station of the calibration UE, that the base station receives the channel matrix information corresponding to the calibration subcarrier comprises:

receiving channel matrix information that is corresponding to the calibration subcarrier of the base station and that is forwarded by the serving base station of the calibration UE.

10. A method for reciprocity calibration, applied to user equipment (UE), the method comprising:

receiving, by the UE, downlink user-dedicated reference signals that are mutually orthogonal between cells corresponding to a base station and sent by the base station by using selected subcarriers;

obtaining, by the UE by calculating according to the downlink user-dedicated reference signal, channel matrix information corresponding to the selected subcarrier of the base station;

wherein obtaining, by the UE by calculating according to the downlink user-dedicated reference signal, channel matrix information corresponding to the selected subcarrier of the base station comprises:

obtaining, by the calibration UE by calculating, a downlink channel estimation matrix corresponding to the calibration subcarrier of the base station, and for the base station except a serving base station of the calibration UE, obtaining, by the calibration UE by calculating, a relative matrix $h_r$ corresponding to the calibration subcarrier of the base station, wherein $h_r = r \cdot h1/h2$, r is a constant, h1 is a downlink channel estimation matrix corresponding to a subcarrier of the base station, and h2 is a downlink channel estimation matrix of the serving base station corresponding to the calibration UE;

sending, by the UE, the channel matrix information corresponding to the selected subcarrier of the base station to a serving base station of the UE; and wherein the UE is a calibration UE, and the selected subcarrier is a calibration subcarrier corresponding to the calibration UE.

11. The method according to claim 10, wherein:

obtaining, by the UE by calculating according to the downlink user-dedicated reference signal, channel matrix information corresponding to the selected subcarrier of the base station comprises:

obtaining, by the calibration UE by calculating according to the downlink user-dedicated reference signal, a downlink channel estimation matrix $h_{DL}$ corresponding to the calibration subcarrier of the base station.

* * * * *